United States Patent
McAlister

(10) Patent No.: US 8,733,331 B2
(45) Date of Patent: May 27, 2014

(54) ADAPTIVE CONTROL SYSTEM FOR FUEL INJECTORS AND IGNITERS

(75) Inventor: Roy E. McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 12/913,749

(22) Filed: Oct. 27, 2010

(65) Prior Publication Data

US 2011/0146619 A1 Jun. 23, 2011

Related U.S. Application Data

(60) Continuation-in-part of application No. 12/841,170, filed on Jul. 21, 2010, now Pat. No. 8,555,860, and a continuation-in-part of application No. 12/581,825, filed on Oct. 19, 2009, now Pat. No. 8,297,254, which (Continued)

(51) Int. Cl.
*F02P 3/05* (2006.01)
*F02P 3/00* (2006.01)

(52) U.S. Cl.
USPC .......................................................... 123/623

(58) Field of Classification Search
USPC ......... 123/536, 538, 539, 623, 679, 620, 435, 123/143 B; 701/103, 104, 150; 73/114.05, 73/114.08, 114.11
See application file for complete search history.

(56) References Cited

U.S. PATENT DOCUMENTS 1,451,384 A 4/1923 Whyte
1,765,237 A 7/1938 King (Continued)

FOREIGN PATENT DOCUMENTS

DE 3443022 A1 5/1986
DE 102005060139 6/2007

(Continued)

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-4.

(Continued)

*Primary Examiner* — Mahmoud Gimie
(74) *Attorney, Agent, or Firm* — Perkins Coie LLP

(57) ABSTRACT

The present disclosure is directed to systems and methods for adjusting the operation of a gasoline-fueled engine based on monitored conditions within a combustion chamber of the engine. In some cases, the system monitors regions within the combustion chamber, identifies or determines a satisfactory condition, and applies an ionization voltage to a fuel injector to initiate a combustion event during the satisfactory condition. In some cases, the system monitors the conditions within the combustion chamber, determines a monitored condition is associated with an adjustment, and adjusts a parameters of a combustion event in order to adjust ionization levels within a combustion chamber.

20 Claims, 7 Drawing Sheets

Related U.S. Application Data is a division of application No. 12/006,774, filed on Jan. 7, 2008, now Pat. No. 7,628,137, said application No. 12/841,170 is a continuation-in-part of application No. 12/653,085, filed on Dec. 7, 2009, now Pat. No. 8,635,985, which is a continuation-in-part of application No. 12/006,774, filed on Jan. 7, 2008, now Pat. No. 7,628,137, said application No. 12/841,170 is a continuation-in-part of application No. PCT/US2009/067044, filed on Dec. 7, 2009, application No. 12/913,749, which is a continuation-in-part of application No. 12/841,146, filed on Jul. 21, 2010, now Pat. No. 8,413,634, and a continuation-in-part of application No. 12/581,825, filed on Oct. 19, 2009, now Pat. No. 8,297,254, and a continuation-in-part of application No. 12/653,085, filed on Dec. 7, 2009, now Pat. No. 8,635,985, and a continuation-in-part of application No. PCT/US2009/067044, filed on Dec. 7, 2009, application No. 12/913,749, which is a continuation-in-part of application No. 12/804,508, filed on Jul. 21, 2010, now Pat. No. 8,387,599, and a continuation-in-part of application No. PCT/US2009/067044, filed on Dec. 7, 2009, and a continuation-in-part of application No. 12/653,085, filed on Dec. 7, 2009, now Pat. No. 8,635,985, and a continuation-in-part of application No. 12/581,825, filed on Oct. 19, 2009, now Pat. No. 8,297,254, application No. 12/913,749, which is a continuation-in-part of application No. 12/804,510, filed on Jul. 21, 2010, now Pat. No. 8,074,625, and a continuation-in-part of application No. 12/581,825, filed on Oct. 19, 2009, now Pat. No. 8,297,254, and a continuation-in-part of application No. 12/653,085, filed on Dec. 7, 2009, now Pat. No. 8,635,985, and a continuation-in-part of application No. PCT/US2009/067044, filed on Dec. 7, 2009, application No. 12/913,749, which is a continuation-in-part of application No. 12/841,149, filed on Jul. 21, 2010, now Pat. No. 8,365,700, and a continuation-in-part of application No. PCT/US2009/067044, filed on Dec. 7, 2009, and a continuation-in-part of application No. 12/653,085, filed on Dec. 7, 2009, now Pat. No. 8,635,985, said application No. 12/841,149 is a continuation-in-part of application No. 12/581,825, filed on Oct. 19, 2009, now Pat. No. 8,297,254, application No. 12/913,749, which is a continuation-in-part of application No. 12/841,135, filed on Jul. 21, 2010, now Pat. No. 8,192,852, and a continuation-in-part of application No. 12/581,825, filed on Oct. 19, 2009, now Pat. No. 8,297,254, and a continuation-in-part of application No. 12/653,085, filed on Dec. 7, 2009, now Pat. No. 8,635,985, and a continuation-in-part of application No. PCT/US2009/067044, filed on Dec. 7, 2009, application No. 12/913,749, which is a continuation-in-part of application No. 12/804,509, filed on Jul. 21, 2010, now Pat. No. 8,561,598, and a continuation-in-part of application No. 12/581,825, filed on Dec. 7, 2009, now Pat. No. 8,297,254, and a continuation-in-part of application No. 12/653,085, filed on Dec. 7, 2009, now Pat. No. 8,635,985, and a continuation-in-part of application No. PCT/US2009/067044, filed on Dec. 7, 2009.

(60) Provisional application No. 61/304,403, filed on Feb. 13, 2010, provisional application No. 61/312,100, filed on Mar. 9, 2010, provisional application No. 61/237,425, filed on Aug. 27, 2009, provisional application No. 61/237,466, filed on Aug. 27, 2009, provisional application No. 61/237,479, filed on Aug. 27, 2009.

(56) References Cited

U.S. PATENT DOCUMENTS

| | | |
|---|---|---|
| 2,255,203 A | 9/1941 | Wiegand |
| 2,441,277 A | 5/1948 | Lamphere |
| 2,721,100 A | 10/1955 | Bodine, Jr. |
| 3,058,453 A | 10/1962 | May |
| 3,060,912 A | 10/1962 | May |
| 3,081,758 A | 3/1963 | May |
| 3,243,335 A | 3/1966 | Faile |
| 3,286,164 A * | 11/1966 | De Huff .................. 324/378 |
| 3,373,724 A | 3/1968 | Papst |
| 3,391,680 A | 7/1968 | Benson |
| 3,520,961 A | 7/1970 | Suda et al. |
| 3,594,877 A | 7/1971 | Suda et al. |
| 3,608,050 A | 9/1971 | Carman et al. |
| 3,689,293 A | 9/1972 | Beall |
| 3,926,169 A | 12/1975 | Leshner et al. |
| 3,931,438 A | 1/1976 | Beall et al. |
| 3,960,995 A | 6/1976 | Kourkene |
| 3,976,039 A | 8/1976 | Henault |
| 3,997,352 A | 12/1976 | Beall |
| 4,020,803 A | 5/1977 | Thuren et al. |
| 4,066,046 A | 1/1978 | McAlister |
| 4,095,580 A | 6/1978 | Murray et al. |
| 4,105,004 A | 8/1978 | Asai et al. |
| 4,116,389 A | 9/1978 | Furtah et al. |
| 4,122,816 A | 10/1978 | Fitzgerald et al. |
| 4,135,481 A | 1/1979 | Resler, Jr. |
| 4,172,921 A | 10/1979 | Kiefer |
| 4,183,467 A | 1/1980 | Sheraton et al. |
| 4,203,393 A | 5/1980 | Giardini |
| 4,293,188 A | 10/1981 | McMahon |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,381,740 A | 5/1983 | Crocker |
| 4,382,189 A | 5/1983 | Wilson |
| 4,391,914 A | 7/1983 | Beall |
| 4,448,160 A | 5/1984 | Vosper |
| 4,469,160 A | 9/1984 | Giamei |
| 4,483,485 A | 11/1984 | Kamiya et al. |
| 4,511,612 A | 4/1985 | Huther et al. |
| 4,528,270 A | 7/1985 | Matsunaga |
| 4,536,452 A | 8/1985 | Stempin et al. |
| 4,567,857 A | 2/1986 | Houseman et al. |
| 4,574,037 A | 3/1986 | Samejima et al. |
| 4,677,960 A | 7/1987 | Ward |
| 4,684,211 A | 8/1987 | Weber et al. |
| 4,688,538 A | 8/1987 | Ward et al. |
| 4,700,891 A | 10/1987 | Hans et al. |
| 4,716,874 A * | 1/1988 | Hilliard et al. ........... 123/406.14 |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,777,925 A | 10/1988 | Lasota |
| 4,834,033 A | 5/1989 | Larsen |
| 4,841,925 A | 6/1989 | Ward |
| 4,922,883 A | 5/1990 | Iwasaki |
| 4,932,263 A | 6/1990 | Wlodarczyk |
| 4,967,708 A | 11/1990 | Linder et al. |
| 4,977,873 A | 12/1990 | Cherry et al. |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |

(56) References Cited

U.S. PATENT DOCUMENTS

| | | | |
|---|---|---|---|
| 5,056,496 A | 10/1991 | Morino et al. | |
| 5,069,189 A | 12/1991 | Saito | |
| 5,072,617 A | 12/1991 | Weiss | |
| 5,076,223 A | 12/1991 | Harden et al. | |
| 5,095,742 A | 3/1992 | James et al. | |
| 5,107,673 A | 4/1992 | Sato et al. | |
| 5,109,817 A | 5/1992 | Cherry | |
| 5,131,376 A | 7/1992 | Ward et al. | |
| 5,150,682 A | 9/1992 | Magnet | |
| 5,193,515 A | 3/1993 | Oota et al. | |
| 5,207,208 A | 5/1993 | Ward | |
| 5,211,142 A | 5/1993 | Matthews et al. | |
| 5,220,901 A | 6/1993 | Morita et al. | |
| 5,222,481 A | 6/1993 | Morikawa | |
| 5,267,601 A | 12/1993 | Dwivedi | |
| 5,297,518 A | 3/1994 | Cherry | |
| 5,305,360 A | 4/1994 | Remark et al. | |
| 5,328,094 A | 7/1994 | Goetzke et al. | |
| 5,329,606 A | 7/1994 | Andreassen | |
| 5,343,699 A | 9/1994 | McAlister | |
| 5,377,633 A | 1/1995 | Wakeman | |
| 5,390,546 A | 2/1995 | Wlodarczyk | |
| 5,392,745 A | 2/1995 | Beck | |
| 5,394,838 A | 3/1995 | Chandler | |
| 5,394,852 A | 3/1995 | McAlister | |
| 5,421,195 A | 6/1995 | Wlodarczyk | |
| 5,421,299 A | 6/1995 | Cherry | |
| 5,435,286 A | 7/1995 | Carroll, III et al. | |
| 5,439,532 A | 8/1995 | Fraas | |
| 5,456,241 A | 10/1995 | Ward | |
| 5,475,772 A | 12/1995 | Hung et al. | |
| 5,497,744 A | 3/1996 | Nagaosa et al. | |
| 5,517,961 A | 5/1996 | Ward | |
| 5,531,199 A | 7/1996 | Bryant et al. | |
| 5,534,781 A * | 7/1996 | Lee et al. | 324/380 |
| 5,549,746 A | 8/1996 | Scott et al. | |
| 5,568,801 A * | 10/1996 | Paterson et al. | 123/598 |
| 5,584,490 A | 12/1996 | Inoue et al. | |
| 5,588,299 A | 12/1996 | DeFreitas | |
| 5,605,125 A | 2/1997 | Yaoita | |
| 5,607,106 A | 3/1997 | Bentz et al. | |
| 5,608,832 A | 3/1997 | Pfandl et al. | |
| 5,662,389 A | 9/1997 | Trugilio et al. | |
| 5,676,026 A | 10/1997 | Tsuboi et al. | |
| 5,694,761 A | 12/1997 | Griffin | |
| 5,699,253 A | 12/1997 | Puskorius et al. | |
| 5,702,761 A | 12/1997 | DiChiara, Jr. et al. | |
| 5,704,321 A | 1/1998 | Suckewer et al. | |
| 5,704,553 A | 1/1998 | Wieczorek et al. | |
| 5,714,680 A | 2/1998 | Taylor et al. | |
| 5,715,788 A | 2/1998 | Tarr et al. | |
| 5,738,818 A | 4/1998 | Atmur et al. | |
| 5,745,615 A | 4/1998 | Atkins et al. | |
| 5,746,171 A | 5/1998 | Yaoita | |
| 5,767,026 A | 6/1998 | Kondoh et al. | |
| 5,769,049 A * | 6/1998 | Nytomt et al. | 123/435 |
| 5,797,427 A | 8/1998 | Buescher | |
| 5,806,581 A | 9/1998 | Haasch et al. | |
| 5,816,217 A | 10/1998 | Wong | |
| 5,853,175 A | 12/1998 | Udagawa | |
| 5,863,326 A | 1/1999 | Nause et al. | |
| 5,876,659 A | 3/1999 | Yasutomi et al. | |
| 5,896,842 A * | 4/1999 | Abusamra | 123/406.39 |
| 5,915,272 A | 6/1999 | Foley et al. | |
| 5,930,420 A | 7/1999 | Atkins et al. | |
| 5,941,207 A | 8/1999 | Anderson et al. | |
| 5,947,091 A | 9/1999 | Krohn et al. | |
| 5,975,032 A | 11/1999 | Iwata | |
| 5,983,855 A | 11/1999 | Benedikt et al. | |
| 6,000,628 A | 12/1999 | Lorraine | |
| 6,015,065 A | 1/2000 | McAlister | |
| 6,017,390 A | 1/2000 | Charych et al. | |
| 6,026,568 A | 2/2000 | Atmur et al. | |
| 6,029,627 A * | 2/2000 | VanDyne | 123/435 |
| 6,029,640 A * | 2/2000 | Bengtsson et al. | 123/599 |
| 6,042,028 A | 3/2000 | Xu | |
| 6,062,498 A | 5/2000 | Klopfer | |
| 6,081,183 A | 6/2000 | Mading et al. | |
| 6,085,990 A | 7/2000 | Augustin | |
| 6,092,501 A | 7/2000 | Matayoshi et al. | |
| 6,092,507 A | 7/2000 | Bauer et al. | |
| 6,093,338 A | 7/2000 | Tani et al. | |
| 6,102,303 A | 8/2000 | Bright et al. | |
| 6,131,607 A | 10/2000 | Cooke | |
| 6,138,639 A | 10/2000 | Hiraya et al. | |
| 6,155,212 A | 12/2000 | McAlister | |
| 6,173,913 B1 | 1/2001 | Shafer et al. | |
| 6,185,355 B1 | 2/2001 | Hung | |
| 6,189,522 B1 | 2/2001 | Moriya | |
| 6,253,728 B1 | 7/2001 | Matayoshi et al. | |
| 6,267,307 B1 | 7/2001 | Pontoppidan | |
| 6,281,976 B1 | 8/2001 | Taylor et al. | |
| 6,318,306 B1 | 11/2001 | Komatsu | |
| 6,335,065 B1 | 1/2002 | Steinlage et al. | |
| 6,338,445 B1 | 1/2002 | Lambert et al. | |
| 6,340,015 B1 | 1/2002 | Benedikt et al. | |
| 6,360,721 B1 | 3/2002 | Schuricht et al. | |
| 6,378,485 B2 | 4/2002 | Elliott | |
| 6,386,178 B1 | 5/2002 | Rauch | |
| 6,446,597 B1 | 9/2002 | McAlister | |
| 6,453,660 B1 | 9/2002 | Johnson et al. | |
| 6,455,173 B1 | 9/2002 | Marijnissen et al. | |
| 6,455,451 B1 | 9/2002 | Brodkin et al. | |
| 6,478,007 B2 | 11/2002 | Miyashita et al. | |
| 6,483,311 B1 | 11/2002 | Ketterer | |
| 6,490,391 B1 | 12/2002 | Zhao et al. | |
| 6,501,875 B2 | 12/2002 | Zhao et al. | |
| 6,503,584 B1 | 1/2003 | McAlister | |
| 6,506,336 B1 | 1/2003 | Beall et al. | |
| 6,516,114 B2 | 2/2003 | Zhao et al. | |
| 6,517,011 B1 | 2/2003 | Ayanji et al. | |
| 6,517,623 B1 | 2/2003 | Brodkin et al. | |
| 6,532,315 B1 | 3/2003 | Hung et al. | |
| 6,536,405 B1 | 3/2003 | Rieger et al. | |
| 6,542,663 B1 | 4/2003 | Zhao et al. | |
| 6,543,700 B2 | 4/2003 | Jameson et al. | |
| 6,549,713 B1 | 4/2003 | Pi et al. | |
| 6,550,458 B2 | 4/2003 | Yamakado et al. | |
| 6,556,746 B1 | 4/2003 | Zhao et al. | |
| 6,561,168 B2 | 5/2003 | Hokao et al. | |
| 6,567,599 B2 | 5/2003 | Hung | |
| 6,571,035 B1 | 5/2003 | Pi et al. | |
| 6,578,775 B2 | 6/2003 | Hokao | |
| 6,583,901 B1 | 6/2003 | Hung | |
| 6,584,244 B2 | 6/2003 | Hung | |
| 6,585,171 B1 | 7/2003 | Boecking | |
| 6,587,239 B1 | 7/2003 | Hung | |
| 6,599,028 B1 | 7/2003 | Shu et al. | |
| 6,615,810 B2 | 9/2003 | Funk et al. | |
| 6,615,899 B1 | 9/2003 | Woodward et al. | |
| 6,619,269 B1 | 9/2003 | Stier et al. | |
| 6,621,964 B2 | 9/2003 | Quinn et al. | |
| 6,647,948 B2 | 11/2003 | Kyuuma et al. | |
| 6,663,027 B2 | 12/2003 | Jameson et al. | |
| 6,668,630 B1 | 12/2003 | Kuglin et al. | |
| 6,672,277 B2 | 1/2004 | Yasuoka et al. | |
| 6,700,306 B2 | 3/2004 | Nakamura et al. | |
| 6,705,274 B2 | 3/2004 | Kubo | |
| 6,719,224 B2 | 4/2004 | Enomoto et al. | |
| 6,722,339 B2 | 4/2004 | Elliott | |
| 6,722,340 B1 | 4/2004 | Sukegawa et al. | |
| 6,722,840 B2 | 4/2004 | Fujisawa et al. | |
| 6,725,826 B2 | 4/2004 | Esteghlal | |
| 6,745,744 B2 | 6/2004 | Suckewer et al. | |
| 6,748,918 B2 | 6/2004 | Rieger et al. | |
| 6,749,043 B2 | 6/2004 | Brown et al. | |
| 6,755,175 B1 | 6/2004 | McKay et al. | |
| 6,756,140 B1 | 6/2004 | McAlister | |
| 6,763,811 B1 | 7/2004 | Tamol, Sr. | |
| 6,776,352 B2 | 8/2004 | Jameson | |
| 6,779,513 B2 | 8/2004 | Pellizzari et al. | |
| 6,786,200 B2 * | 9/2004 | Viele et al. | 123/406.27 |

(56) References Cited

U.S. PATENT DOCUMENTS

| | | |
|---|---|---|
| 6,796,516 B2 | 9/2004 | Maier et al. |
| 6,799,513 B2 | 10/2004 | Schafer |
| 6,802,894 B2 | 10/2004 | Brodkin et al. |
| 6,811,103 B2 | 11/2004 | Gurich et al. |
| 6,814,313 B2 | 11/2004 | Petrone et al. |
| 6,832,472 B2 | 12/2004 | Huang et al. |
| 6,832,588 B2 | 12/2004 | Herden et al. |
| 6,845,920 B2 | 1/2005 | Sato et al. |
| 6,851,413 B1 | 2/2005 | Tamol, Sr. |
| 6,854,438 B2 | 2/2005 | Hilger et al. |
| 6,871,630 B2 | 3/2005 | Herden et al. |
| 6,883,490 B2 | 4/2005 | Jayne |
| 6,892,971 B2 | 5/2005 | Rieger et al. |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,925,983 B2 | 8/2005 | Herden et al. |
| 6,940,213 B1 | 9/2005 | Heinz et al. |
| 6,954,074 B2 | 10/2005 | Zhu et al. |
| 6,955,154 B1 | 10/2005 | Douglas |
| 6,959,693 B2 | 11/2005 | Oda |
| 6,976,683 B2 | 12/2005 | Eckert et al. |
| 6,984,305 B2 | 1/2006 | McAlister |
| 6,993,960 B2 | 2/2006 | Benson |
| 6,994,073 B2 | 2/2006 | Tozzi et al. |
| 7,007,658 B1 | 3/2006 | Cherry et al. |
| 7,007,661 B2 | 3/2006 | Warlick |
| 7,013,863 B2 | 3/2006 | Shiraishi et al. |
| 7,025,358 B2 | 4/2006 | Ueta et al. |
| 7,032,845 B2 | 4/2006 | Dantes et al. |
| 7,070,126 B2 | 7/2006 | Shinogle |
| 7,073,480 B2 | 7/2006 | Shiraishi et al. |
| 7,077,100 B2 | 7/2006 | Vogel et al. |
| 7,077,108 B2 | 7/2006 | Fujita et al. |
| 7,077,379 B1 | 7/2006 | Taylor |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,131,426 B2 | 11/2006 | Ichinose et al. |
| 7,137,382 B2 * | 11/2006 | Zhu et al. .................... 123/435 |
| 7,138,046 B2 | 11/2006 | Roychowdhury |
| 7,140,347 B2 | 11/2006 | Suzuki et al. |
| 7,140,353 B1 | 11/2006 | Rauznitz et al. |
| 7,140,562 B2 | 11/2006 | Holzgrefe et al. |
| 7,198,208 B2 | 4/2007 | Dye et al. |
| 7,201,136 B2 | 4/2007 | McKay et al. |
| 7,204,133 B2 | 4/2007 | Benson et al. |
| 7,228,840 B2 | 6/2007 | Sukegawa et al. |
| 7,249,578 B2 | 7/2007 | Fricke et al. |
| 7,255,290 B2 | 8/2007 | Bright et al. |
| 7,272,487 B2 | 9/2007 | Christen et al. |
| 7,278,392 B2 | 10/2007 | Zillmer et al. |
| 7,305,971 B2 | 12/2007 | Fujii |
| 7,309,029 B2 | 12/2007 | Boecking |
| 7,340,118 B2 | 3/2008 | Wlodarczyk et al. |
| 7,367,319 B2 | 5/2008 | Kuo et al. |
| 7,386,982 B2 | 6/2008 | Runkle et al. |
| 7,404,395 B2 | 7/2008 | Yoshimoto |
| 7,409,929 B2 | 8/2008 | Miyahara et al. |
| 7,418,940 B1 | 9/2008 | Yi et al. |
| 7,481,043 B2 | 1/2009 | Hirata et al. |
| 7,484,369 B2 | 2/2009 | Myhre |
| 7,513,222 B2 | 4/2009 | Orlosky |
| 7,527,041 B2 | 5/2009 | Wing et al. |
| 7,540,271 B2 | 6/2009 | Stewart et al. |
| 7,554,250 B2 | 6/2009 | Kadotani et al. |
| 7,588,012 B2 | 9/2009 | Gibson et al. |
| 7,625,531 B1 | 12/2009 | Coates et al. |
| 7,626,315 B2 | 12/2009 | Nagase |
| 7,628,137 B1 | 12/2009 | McAlister |
| 7,650,873 B2 | 1/2010 | Hofbauer et al. |
| 7,690,352 B2 * | 4/2010 | Zhu et al. ................ 123/406.14 |
| 7,703,775 B2 | 4/2010 | Matsushita et al. |
| 7,707,832 B2 | 5/2010 | Commaret et al. |
| 7,714,483 B2 | 5/2010 | Hess et al. |
| 7,728,489 B2 | 6/2010 | Heinz et al. |
| 7,849,833 B2 | 12/2010 | Toyoda |
| 7,880,193 B2 | 2/2011 | Lam |
| 7,886,993 B2 | 2/2011 | Bachmaier et al. |
| 7,898,258 B2 | 3/2011 | Neuberth et al. |
| 7,918,212 B2 | 4/2011 | Verdejo et al. |
| 7,938,102 B2 | 5/2011 | Sherry |
| 7,942,136 B2 | 5/2011 | Lepsch et al. |
| 8,069,836 B2 | 12/2011 | Ehresman |
| 2002/0017573 A1 | 2/2002 | Sturman |
| 2002/0070287 A1 | 6/2002 | Jameson et al. |
| 2002/0084793 A1 | 7/2002 | Hung et al. |
| 2002/0131171 A1 | 9/2002 | Hung |
| 2002/0131666 A1 | 9/2002 | Hung et al. |
| 2002/0131673 A1 | 9/2002 | Hung |
| 2002/0131674 A1 | 9/2002 | Hung |
| 2002/0131686 A1 | 9/2002 | Hung |
| 2002/0131706 A1 | 9/2002 | Hung |
| 2002/0131756 A1 | 9/2002 | Hung |
| 2002/0141692 A1 | 10/2002 | Hung |
| 2002/0150375 A1 | 10/2002 | Hung et al. |
| 2002/0151113 A1 | 10/2002 | Hung et al. |
| 2002/0166536 A1 | 11/2002 | Hitomi et al. |
| 2003/0012985 A1 | 1/2003 | McAlister |
| 2003/0042325 A1 | 3/2003 | D'Arrigo |
| 2003/0127531 A1 | 7/2003 | Hohl |
| 2003/0230074 A1 * | 12/2003 | Huang et al. .................... 60/285 |
| 2004/0008989 A1 | 1/2004 | Hung |
| 2004/0084017 A1 * | 5/2004 | Viele et al. ............... 123/406.14 |
| 2004/0084026 A1 * | 5/2004 | Zhu et al. .................... 123/435 |
| 2004/0085069 A1 * | 5/2004 | Zhu et al. .................... 324/388 |
| 2004/0123653 A1 * | 7/2004 | Benson ........................ 73/118.1 |
| 2004/0187847 A1 * | 9/2004 | Viele et al. ............... 123/406.27 |
| 2004/0256495 A1 | 12/2004 | Baker |
| 2005/0045146 A1 | 3/2005 | McKay et al. |
| 2005/0098663 A1 | 5/2005 | Ishii |
| 2005/0126537 A1 * | 6/2005 | Daniels et al. ........... 123/406.14 |
| 2005/0255011 A1 | 11/2005 | Greathouse et al. |
| 2005/0257776 A1 | 11/2005 | Bonutti |
| 2006/0000260 A1 * | 1/2006 | Benson et al. ............... 73/35.08 |
| 2006/0005738 A1 | 1/2006 | Kumar |
| 2006/0005739 A1 | 1/2006 | Kumar |
| 2006/0016916 A1 | 1/2006 | Petrone et al. |
| 2006/0037563 A1 | 2/2006 | Raab et al. |
| 2006/0102140 A1 | 5/2006 | Sukegawa et al. |
| 2006/0108452 A1 | 5/2006 | Anzinger et al. |
| 2006/0169244 A1 | 8/2006 | Allen |
| 2007/0142204 A1 | 6/2007 | Park et al. |
| 2007/0186903 A1 * | 8/2007 | Zhu et al. ................. 123/406.37 |
| 2007/0189114 A1 | 8/2007 | Reiner et al. |
| 2007/0283927 A1 | 12/2007 | Fukumoto et al. |
| 2008/0072871 A1 | 3/2008 | Vogel et al. |
| 2008/0081120 A1 | 4/2008 | Van Ooij et al. |
| 2008/0098984 A1 | 5/2008 | Sakamaki |
| 2008/0103672 A1 | 5/2008 | Ueda et al. |
| 2009/0078798 A1 | 3/2009 | Gruendl |
| 2009/0093951 A1 | 4/2009 | McKay et al. |
| 2009/0101114 A1 * | 4/2009 | Czekala et al. ................ 123/480 |
| 2009/0204306 A1 | 8/2009 | Goeke et al. |
| 2009/0264574 A1 | 10/2009 | Van Ooij et al. |
| 2010/0020518 A1 | 1/2010 | Bustamante |
| 2010/0043758 A1 | 2/2010 | Caley |
| 2010/0077986 A1 | 4/2010 | Chen |
| 2010/0108023 A1 | 5/2010 | McAlister |
| 2010/0183993 A1 | 7/2010 | McAlister |
| 2011/0036309 A1 | 2/2011 | McAlister |
| 2011/0042476 A1 | 2/2011 | McAlister |
| 2011/0048371 A1 | 3/2011 | McAlister |
| 2011/0048374 A1 | 3/2011 | McAlister |
| 2011/0048381 A1 | 3/2011 | McAlister |
| 2011/0056458 A1 | 3/2011 | McAlister |
| 2011/0057058 A1 | 3/2011 | McAlister |
| 2011/0132319 A1 | 6/2011 | McAlister |
| 2011/0134049 A1 | 6/2011 | Lin et al. |
| 2011/0210182 A1 | 9/2011 | McAlister |

(56) References Cited

U.S. PATENT DOCUMENTS

| | | |
|---|---|---|
| 2011/0233308 A1 | 9/2011 | McAlister |
| 2011/0253104 A1 | 10/2011 | McAlister |
| 2011/0297753 A1 | 12/2011 | McAlister et al. |

FOREIGN PATENT DOCUMENTS

| | | |
|---|---|---|
| EP | 392594 | 10/1990 |
| EP | 671555 | 9/1995 |
| EP | 1972606 A1 | 9/2008 |
| GB | 1038490 A | 8/1966 |
| JP | 61-023862 | 2/1986 |
| JP | 02-259268 | 10/1990 |
| JP | 08-049623 | 2/1996 |
| JP | 2008-334077 | 12/1996 |
| JP | 2004-324613 A | 11/2004 |
| KR | 2007-0026296 A | 3/2007 |
| KR | 2008-0073635 A | 8/2008 |
| WO | WO-2008-017576 | 2/2008 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-6.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.

Birchenough, Arthur G. "A Sustained-arc Ignition System for Internal Combustion Engines." Nasa Technical Memorandum (NASA TM-73833). Lewis Research Center. Nov. 1977. pp. 1-15.

Britt, Robert Roy. "Powerful Solar Storm Could Shut Down U.S. for Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp. 1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.

InfraTec GmbH. "Evaluation Kit for FPI Detectors | Datasheet—Detector Accessory." 2009. pp. 1-2.

International Search Report and Written Opinion for Application No. PCT/US2010/002076; Applicant: McAlister Technologies, LLC.; Date of Mailing: Apr. 29, 2011 (8 pages).

International Search Report and Written Opinion for Application No. PCT/US2010/002077; Applicant: McAlister Technologies, LLC.; Date of Mailing: Apr. 29, 2011 (8 pages).

International Search Report and Written Opinion for Application No. PCT/US2010/002078; Applicant: McAlister Technologies, LLC.; Date of Mailing: Dec. 17, 2010 (9 pages).

International Search Report and Written Opinion for Application No. PCT/US2010/042812; Applicant: McAlister Technologies, LLC.; Date of Mailing: May 13, 2011 (9 pages).

International Search Report and Written Opinion for Application No. PCT/US2010/042817; Applicant: McAlister Technologies, LLC.; Date of Mailing: Apr. 29, 2011 (8 pages).

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Non-Final Office Action for U.S. Appl. No. 12/006,774; Applicant: McAlister Technologies, LLC; Date of Mailing: Jan. 30, 2009, 18 pages.

Non-Final Office Action for U.S. Appl. No. 12/581,825; Applicant: McAlister Technologies, LLC; Date of Mailing: Mar. 25, 2011 (15 pages).

Non-Final Office Action for U.S. Appl. No. 12/804,510; Applicant: McAlister Technologies, LLC; Date of Mailing: Mar. 1, 2011 (10 pages).

Non-Final Office Action for U.S. Appl. No. 12/961,453; Applicant: McAlister Technologies, LLC; Date of Mailing: Jun. 9, 2011 (4 pges).

Notice of Allowance for U.S. Appl. No. 12/006,774; Applicant: McAlister Technologies, LLC; Date of Mailing: Jul. 27, 2009, 20 pages.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 83-91.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-051601-11.

Salib et al. "Role of Parallel Reformable Bonds in the Self-Healing of Cross-Linked Nanogel Particles." Langmuir, vol. 27, Issue 7. 2011. pp. 3991-4003.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

International Search Report and Written Opinion for Application No. PCT/US2010/054361; Applicant: McAlister Technologies, LLC.; Date of Mailing: Jun. 30, 2011, 9 pages.

International Search Report and Written Opinion for Application No. PCT/US2010/054364; Applicant: McAlister Technologies, LLC.; Date of Mailing: Aug. 22, 2011, 8 pages.

International Search Report and Written Opinion for Application No. PCT/US2010/059146; Applicant: McAlister Technologies, LLC.; Date of Mailing: Aug. 31, 2011, 11 pages.

International Search Report and Written Opinion for Application No. PCT/US2010/059147; Applicant: McAlister Technologies, LLC.; Date of Mailing: Aug. 31, 2011, 11 pages.

Non-Final Office Action for U.S. Appl. No. 13/027,051; Applicant: McAlister Technologies, LLC; Date of Mailing: Sep. 1, 2011, 7 pages.

Non-Final Office Action for U.S. Appl. No. 13/141,062; Applicant: McAlister Technologies, LLC; Date of Mailing: Aug. 11, 2011, 12 pages.

International Search Report and Written Opinion for Application No. PCT/US2011/024778 Applicant: McAlister Technologies, LLC.; Date of Mailing: Sep. 27, 2011 (10 pages).

Non-Final Office Action for U.S. Appl. No. 12/961,461; Applicant: McAlister et al.; Date of Mailing: Jan. 17, 2012, 39 pages.

Final Office Action for U.S. Appl. No. 13/027,051; Applicant: McAlister Technologies, LLC; Date of Mailing: Oct. 20, 2011, 10 pages.

(56) References Cited

OTHER PUBLICATIONS

International Search Report and Written Opinion for Application No. PCT/US2010/042815; Applicant: McAlister Technologies, LLC.; Date of Mailing: Apr. 29, 2011 (10 pages).

International Search Report and Written Opinion for Application No. PCT/US2009/067044; Applicant: McAlister Technologies, LLC.; Date of Mailing: Apr. 14, 2010 (11 pages).

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2011/024778 Applicant: McAlister Technologies, LLC.; Date of Mailing:.Sep. 27, 2011 (10 pages).

* cited by examiner

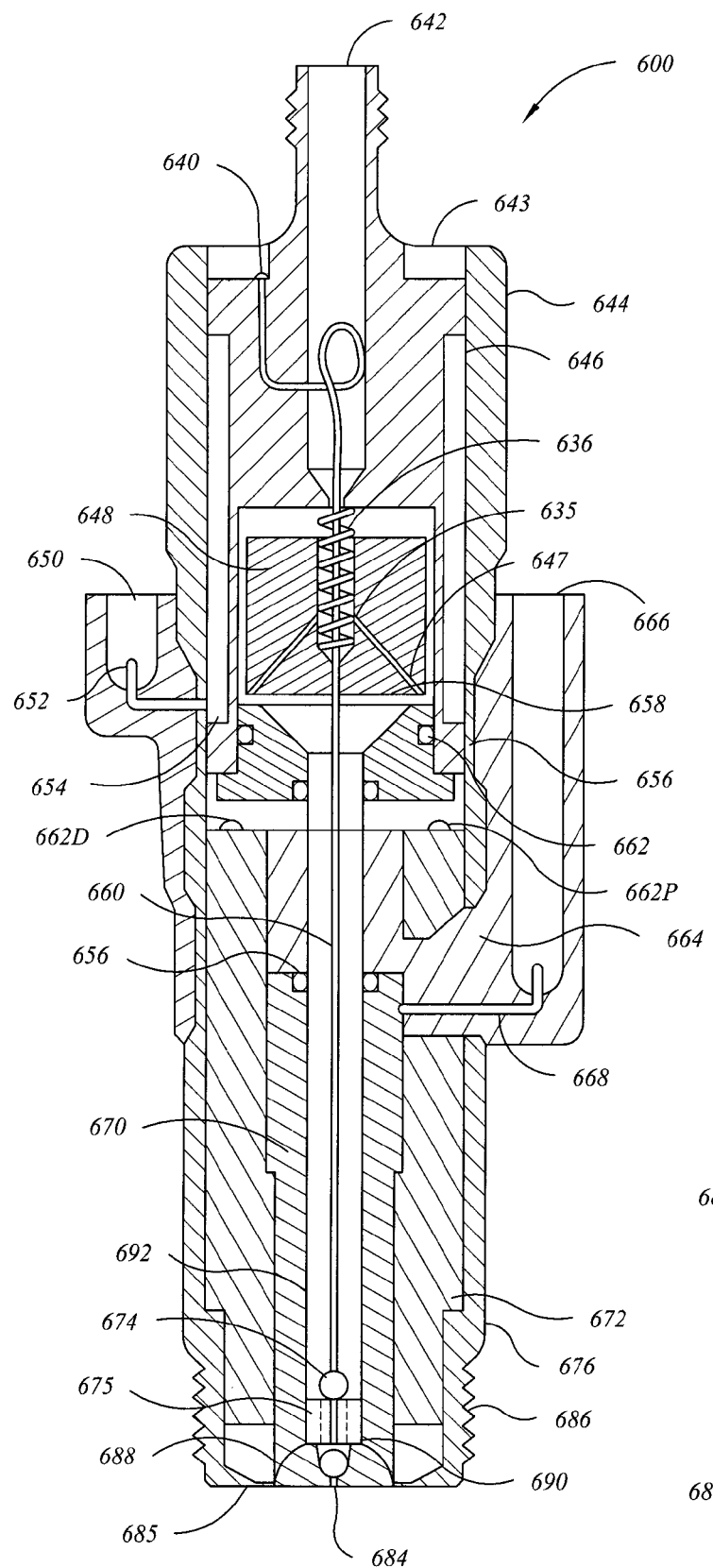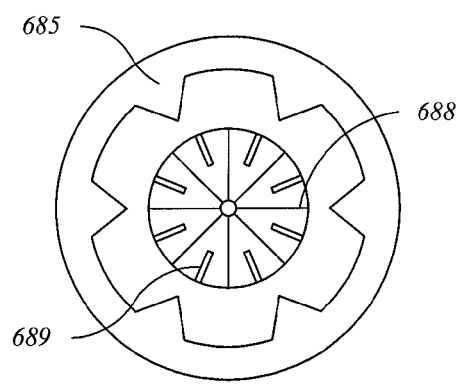
*Fig. 6*
*Fig. 7*

ADAPTIVE CONTROL SYSTEM FOR FUEL INJECTORS AND IGNITERS

CROSS-REFERENCE TO RELATED APPLICATION(S)

The present application claims priority to and the benefit of each of the following: U.S. Provisional Application No. 61/304,403, filed Feb. 13, 2010 and titled FULL SPECTRUM ENERGY AND RESOURCE INDEPENDENCE, and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. The present application is a continuation-in-part of each of the following: U.S. patent application Ser. No. 12/841,170, filed Jul. 21, 2010 and titled INTEGRATED FUEL INJECTORS AND IGNITERS AND ASSOCIATED METHODS OF USE AND MANUFACTURE; U.S. patent application Ser. No. 12/804,510, filed Jul. 21, 2010 and titled FUEL INJECTOR ACTUATOR ASSEMBLIES AND ASSOCIATED METHODS OF USE AND MANUFACTURE; U.S. patent application Ser. No. 12/841,146, filed Jul. 21, 2010 and titled INTEGRATED FUEL INJECTOR IGNITERS WITH CONDUCTIVE CABLE ASSEMBLIES; U.S. patent application Ser. No. 12/841,149, filed Jul. 21, 2010 and titled SHAPING A FUEL CHARGE IN A COMBUSTION CHAMBER WITH MULTIPLE DRIVERS AND/OR IONIZATION CONTROL; U.S. patent application Ser. No. 12/841,135, filed Jul. 21, 2010 and titled CERAMIC INSULATOR AND METHODS OF USE AND MANUFACTURE THEREOF; U.S. patent application Ser. No. 12/804,509, filed Jul. 21, 2010 and titled METHOD AND SYSTEM OF THERMOCHEMICAL REGENERATION TO PROVIDE OXYGENATED FUEL, FOR EXAMPLE, WITH FUEL-COOLED FUEL INJECTORS; and U.S. patent application Ser. No. 12/804,508, filed Jul. 21, 2010 and titled METHODS AND SYSTEMS FOR REDUCING THE FORMATION OF OXIDES OF NITROGEN DURING COMBUSTION IN ENGINES. Furthermore, each of the preceding applications: claims priority to and the benefit of U.S. Provisional Application No. 61/237,425, filed Aug. 27, 2009 and titled OXYGENATED FUEL PRODUCTION; claims priority to and the benefit of U.S. Provisional Application No. 61/237,466, filed Aug. 27, 2009 and titled MULTIFUEL MULTIBURST; claims priority to and the benefit of U.S. Provisional Application No. 61/237,479, filed Aug. 27, 2009 and titled FULL SPECTRUM ENERGY; is a continuation-in-part of U.S. patent application Ser. No. 12/581,825, filed Oct. 19, 2009 and titled MULTIFUEL STORAGE, METERING AND IGNITION SYSTEM; is a continuation-in-part of PCT Application No. PCT/US09/67044, filed Dec. 7, 2009 and titled INTEGRATED FUEL INJECTORS AND IGNITERS AND ASSOCIATED METHODS OF USE AND MANUFACTURE; is a continuation-in-part of U.S. patent application Ser. No. 12/653,085, filed Dec. 7, 2009 and titled INTEGRATED FUEL INJECTORS AND IGNITERS AND ASSOCIATED METHODS OF USE AND MANUFACTURE; claims priority to and the benefit of U.S. Provisional Application No. 61/304,403, filed Feb. 13, 2010 and titled FULL SPECTRUM ENERGY AND RESOURCE INDEPENDENCE; and claims priority to and the benefit of U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. Moreover, U.S. patent application Ser. No. 12/581,825 is a divisional of U.S. patent application Ser. No. 12/006,774 (now U.S. Pat. No. 7,628,137), filed Jan. 7, 2008 and titled MULTIFUEL STORAGE, METERING AND IGNITION SYSTEM. PCT Application No. PCT/US09/67044 claims priority to and the benefit of U.S. Provisional Application No. 61/237,466, filed Aug. 27, 2009 and titled MULTIFUEL MULTIBURST. U.S. patent application Ser. No. 12/653,085 is a continuation-in-part of U.S. patent application Ser. No. 12/006,774 (now U.S. Pat. No. 7,628,137), filed Jan. 7, 2008 and titled MULTIFUEL STORAGE, METERING AND IGNITION SYSTEM; and claims priority to and the benefit of U.S. Provisional Application No. 61/237,466, filed Aug. 27, 2009 and titled MULTIFUEL MULTIBURST. Each of the applications referenced above is incorporated herein by reference in its entirety.

TECHNICAL FIELD

The following disclosure relates generally to integrated fuel injectors and igniters and associate components for storing, injecting, and igniting various fuels.

BACKGROUND

Gasoline-fueled engines are generally designed to achieve manufacturing cost savings that allow intentional design inefficiencies and losses due to the control method and purpose of throttling (restricting) the air entering the engine and due to the production of homogeneous air-fuel mixtures that are delivered to the combustion chambers. Gasoline engines are operated throughout the designed operating speeds or RPM (Revolutions Per Minute) and torque range at approximately stoichiometric air/fuel proportions to form a homogeneous mixture that is spark ignitable everywhere in the combustion chamber. Control of the power produced is a function of the degree of throttling to reduce the air intake and corresponding reduction (limitation) of the amount of fuel that is added. In modern engines that achieve some degree of toxic emissions reduction, fuel is proportioned in response to the magnitude of the intake system vacuum to provide a homogeneous charge that is on the surplus air or "lean fuel side" of the stoichiometric air/fuel ratio for complete combustion.

Most homogeneous charge engines are operated with variable restriction (throttling) of the air entering the intake system and with electronically operated fuel injectors that spray fuel into the intake system at each location or intake manifold port of a mechanical cam operated intake valve. Thus the cam-operated intake valve provides the final timing of the entry into each combustion chamber of the resulting homogeneous air-fuel mixture.

At "idle" (lowest sustained RPM) and during deceleration of the engine, which produce the highest intake vacuum conditions, about 14.7 mass parts of air is mixed with a little less than one mass part of fuel (or about 14.7:1) to form a homogeneous charge with the least amount of energy release upon combustion. When accelerating and traveling at a higher RPM, more air is throttled into the intake system and more fuel can be added to maintain the approximate 14.7:1 air/fuel proportions in the homogeneous charge that is provided for cruise and higher power operation.

Maintaining a vacuum in the intake system of an engine requires considerable power, which must be subtracted from the output power that the engine can deliver. In all modes of operation including idle, cruise and acceleration, substantial power of an engine is spent on parasitic losses, including the power required for intake vacuum maintenance.

Diesel engines do not throttle the air entering the combustion chambers, which provides the advantage of avoiding the loss of output power that is required to maintain an intake system vacuum. The air/fuel ratios for diesel engines under full load are between 17:1 and 29:1. When idling or under no load, this ratio can exceed 145:1. Within the combustion chamber of a direct injection operated diesel, localized air/fuel ratios vary. Because the diesel fuel injection is designed to deliver liquid fuel as streams or droplets, it may not be possible to initially achieve a homogenous mixing of the fuel with the air.

Ignition and sustained combustion can only occur after "atomization" in which high velocity sprays of liquid fuel droplets evaporate by penetrating sufficient hot air and then "crack" by penetrating additional hot air to break large molecules into smaller components that can be oxidized to release sufficient heat to produce a continuing chain reaction.

High-pressure diesel fuel injection results in better fuel atomization to reduce the amount of fuel that fails to complete the oxidation sequence to thus allow various pollutants including visible smoke particles to pass out of the combustion chamber. Recent advancements have provided increased fuel injection pressures, which causes more heat to be generated in the pumping system and requires greater power to be diverted from the engine's output power in order to accomplish the fuel pumping and fuel re-circulation requirements for cooling the high pressure fuel delivery circuits.

Combustion characteristics of diesel fuel as a result of droplet evaporation and chemical cracking in compression heated air is a function of variables such as: Compression ratio, Barometric pressure, Supercharge pressure, Temperature of air entering the combustion chamber, Temperature of the compressed air after heat losses to the piston, cylinder, and head, Timing of start of injection, Injection pressure, Injection orifice size, number, and orientation, Injection duration, Injector discharge curve, and so on.

Given particular magnitudes of compression ratio, barometric pressure, supercharge pressure, and the air temperature at the beginning of compression, and the temperature of the compressed air after heat losses to the piston, cylinder, and engine head components, the electronic timing of the start of direct diesel fuel injection may be adjusted to meet the torque requirement or engine load. In high speed diesel engines for automotive applications, optimized injection at start up, idle or no external load is about 2 crankshaft degrees Before Top Dead Center (BTDC) to 4 degrees After Top Dead Center (ATDC) in some instances to allow quicker start up.

At part load timing of the beginning of diesel fuel may be adjusted to about 8 degrees BTDC to 4 degrees ATDC. Because of the considerable "diesel delay" time needed for the diesel fuel droplets to evaporate and crack depending upon the temperature and pressure of the air as a result of the rate and degree of compression and resulting heat losses to the piston, cylinder, and engine head components, the timing of the beginning of diesel fuel injection must be advanced. To produce maximum rated toque for full load, the start of diesel fuel injection may begin at 8 to 16 degrees BTDC and the duration of combustion at the maximum fuel rate varies between about 40 to 70 degrees of crankshaft rotation.

Timing the initiation of diesel fuel injection too early during the compression stroke causes considerable combustion when the piston is still rising, reducing net torque production and compromised thermal efficiency because of greater heat losses to the piston, cylinder and engine head components. This results in an increased rate of fuel consumption and engine maintenance. However such operation may be purposely done to increase the heat delivery to catalytic reactors and other after treatment equipment. The sharp rise in cylinder pressure during compression also increases bearing and ring wear and engine noise. In comparison, if the beginning of diesel fuel injection is too late, net torque is also reduced and incomplete combustion results, increasing the emissions of unburned hydrocarbons.

In more popular homogeneous charge engines with port fuel injected gasoline operation, the amount of fuel injected is directly proportional to the degree that the air is throttled and the injector "open" or opening time. In comparison, a modern diesel injector will more nearly vary the mass flow of diesel fuel as functions of the difference between the injection and combustion chamber pressures, the density of the fuel, which is temperature dependent, and the dynamic compressibility of the fuel.

In order to cope with the variables noted previously and in attempts to reduce problematic emissions, electronically controlled and operated diesel fuel injectors may provide several injection periods for different compromises and purposes including:

First-injection of short duration to reduce the rate of combustion pressure rise, which may reduce combustion noise and to some degree reduce Oxides of Nitrogen (NOx) production during rapid pressure rise "diesel knock" combustion;

Second-injection of the major portion of fuel delivery is then added to provide the main injection phase;

Third-injection may be added in an attempt to penetrate less spent air to reduce soot emissions by kindling an afterburn to consume otherwise quenched hydrocarbons that failed to burn completely as a result of the first and second injections; and Fourth-injection at up to 180 crankshaft degrees later, to provide a retarded post-injection to serve as a non-power producing re-heating purpose, particularly for enabling NOx accumulator-type catalytic converters and/or to sufficiently increase the average exhaust gas temperature for "burning out" collected hydrocarbon particles in a process called "regeneration" of a ceramic particulate filter.

Typical diesel fuel injection amounts vary from about 1 cubic millimeter for First-injection or pre-injection up to about 50 cubic millimeters for full-load delivery. The injection duration is 1-2 milliseconds.

Most automotive types of diesel engines utilize common rail delivery of fuel to each diesel fuel injector. This provides separation of fuel pressurization and fuel injection functions and thus a common rail system is generally able to supply fuel over a broader range of injection timing and pressure values than previous systems with combined mechanical pressurization and timing operations.

A high-pressure pump pressurizes the fuel for delivery by the common rail. A master fuel rail control and pressure regulation valve allows the fuel pressure to be maintained at a level set by the Electronic Control Unit. The common rail pressure that is maintained serves each fuel injector. An electronic computer (ECU) receives sensor inputs of the fuel pressure, engine speed, camshaft position, accelerator pedal travel, supercharger boost pressure, intake air temperature, and engine coolant temperature. Depending upon the application, additional sensors may report vehicle speed, exhaust temperature, exhaust oxygen concentration, catalyst backpressure, and particulate trap back pressure.

In most instances common rail diesel engines still require glow plugs to preheat the air to enable start-up in cold weather. In addition to controlling the glow plugs, additional functions of the ECU are to adjust the mechanical supercharger or exhaust driven turbocharger boost pressure, the degree of exhaust gas recirculation and in some engines the intake port tunable flaps to induce swirl or other intake air flow momentums.

The high-pressure pumps supply diesel fuel at up to 1600 Bar (23,500 PSI) through the common rail system. Such pumps are driven from the crankshaft and in many instances are radial piston designs. Lubrication of these very high-pressure pump components is by carefully filtered diesel fuel. A typical pump requires the engine to contribute up to about 4 kW from the net output capacity.

Fuel pressure control is typically performed by a solenoid valve in which the valve opening is varied by pulse width modulation at a frequency of 1 KHz. At times when the pressure control valve is not activated, an internal spring maintains a fuel pressure of about 100 Bar (1500 PSI). At times that the valve is activated, force applied by the electromagnetic plunger aids the spring, reducing the net opening of the valve to increase the delivered fuel pressure. Fuel pressure control valves may also act as a mechanical pressure damper to reduce high frequency pressure pulses from the pump.

Two approaches to diesel engine emissions reduction are popular: Exhaust gas recirculation, and Urea addition in the exhaust system to provide hydrogen-induced reduction of oxides of nitrogen that have been produced by the combustion chamber operations.

Exhaust gas recirculation provides a portion of the exhaust gas for mixing with the intake air charge to reduce oxides of nitrogen emissions. It reduces the oxygen concentration and availability in the combustion chamber, the peak combustion temperature, and the exhaust gas temperature. It also greatly reduces the volumetric efficiency of the engine. Recirculation rates may be as high as 50 percent during parts of the operating conditions.

Recirculation causes many of the same efficiency compromises that throttling the air produces in homogeneous charge engine operation.

Unburned fuel oxidation-type catalytic converters are used to reduce hydrocarbon and carbon monoxide emissions by promoting reaction of unburned fuel constituents with oxygen that is preheated in the combustion chamber. Unburned fuel constituents such as carbon monoxide and hydrocarbons that escape through the exhaust valve of the combustion chamber are oxidized to form water and carbon dioxide. In order to rapidly reach their operating temperature, this type of catalytic converter is fitted close to the engine.

Accumulator-type catalytic converters are also used to attenuate oxides of nitrogen that are produced in the combustion process. This type of reactor breaks down NOx by increasing the dwell time by storing it over periods from 30 seconds to several minutes. Nitrogen oxides combine with metal oxides on the surface of the NOx accumulator to form nitrates at times that the air/fuel ratio is fuel lean to provide fuel combustion with excess oxygen.

However, such NOx storage is only short-term and when the oxides of nitrogen block the access to additional oxides of nitrogen, the "polarized" catalytic converter must be regenerated by a process of releasing and converting the stored NOx into diatomic molecules of nitrogen and oxygen. Such regeneration requires the engine to briefly operate at a rich mixture. Illustratively, the engine must be run at a rich-fuel mixture of an air/fuel ratio of about 13.8:1 for a time sufficient to allow new arrivals of NOx to combine temporarily with metal oxides on the surfaces of the NOx accumulator.

Detecting when regeneration must occur, and then when it has been sufficiently completed, is complex and subject to false signals. One approach is to utilize a model that infers and calculates the quantity of stored nitrogen oxides on the basis of catalytic converter temperature. Another approach provides a specific NOx sensor located downstream of the accumulator catalytic converter for detection of the loss of effectiveness of the metal oxides in the accumulator assembly. Determination of sufficient regeneration is either by a model-based approach or an oxygen sensor located downstream of the catalyst bed. A change in signal from high oxygen to low oxygen may indicate the approach to the end of the regeneration operation.

In order assure that the NOx storage catalyst system works effectively from cold start or lightly loaded engine operations, an electric resistance heater is often provided to heat the exhaust gas. This creates another parasitic loss of power and increases the fuel consumption of the engine to produce the electricity, store it in a battery, and to dissipate the stored energy in a way that does not provide useful work by the engine. In addition, it is another costly maintenance item.

Another type of parasitic loss and operating expense concerns the use of a reducing agent such as dilute urea as an exhaust treatment for reducing NOx in diesel exhaust gases. In this approach, a reducing agent such as dilute urea solution is added to the exhaust in relatively small quantities. A hydrolyzing catalytic converter dissociates the urea to ammonia, which releases hydrogen to react with NOx to form nitrogen and water. This system is may be sufficiently effective for reducing NOx emissions so that leaner than normal air/fuel ratios can be used, hopefully resulting in improved fuel economy to offset some of the urea dispensing system and cost of operation. The urea tank is instrumented to alert the need to be refilled as needed to provide reduced oxides of nitrogen in the exhaust.

These and other limitations exist with respect to operating gasoline- and diesel-fueled engines.

BRIEF DESCRIPTION OF THE DRAWINGS

FIG. 6 is a longitudinal section view of an adaptively controlled igniter/injector in accordance with an embodiment of the disclosure.

FIG. 7 is an end view of the adaptively controlled igniter/injector of FIG. 6 configured in accordance with an embodiment of the disclosure.

DETAILED DESCRIPTION

Figure 1:
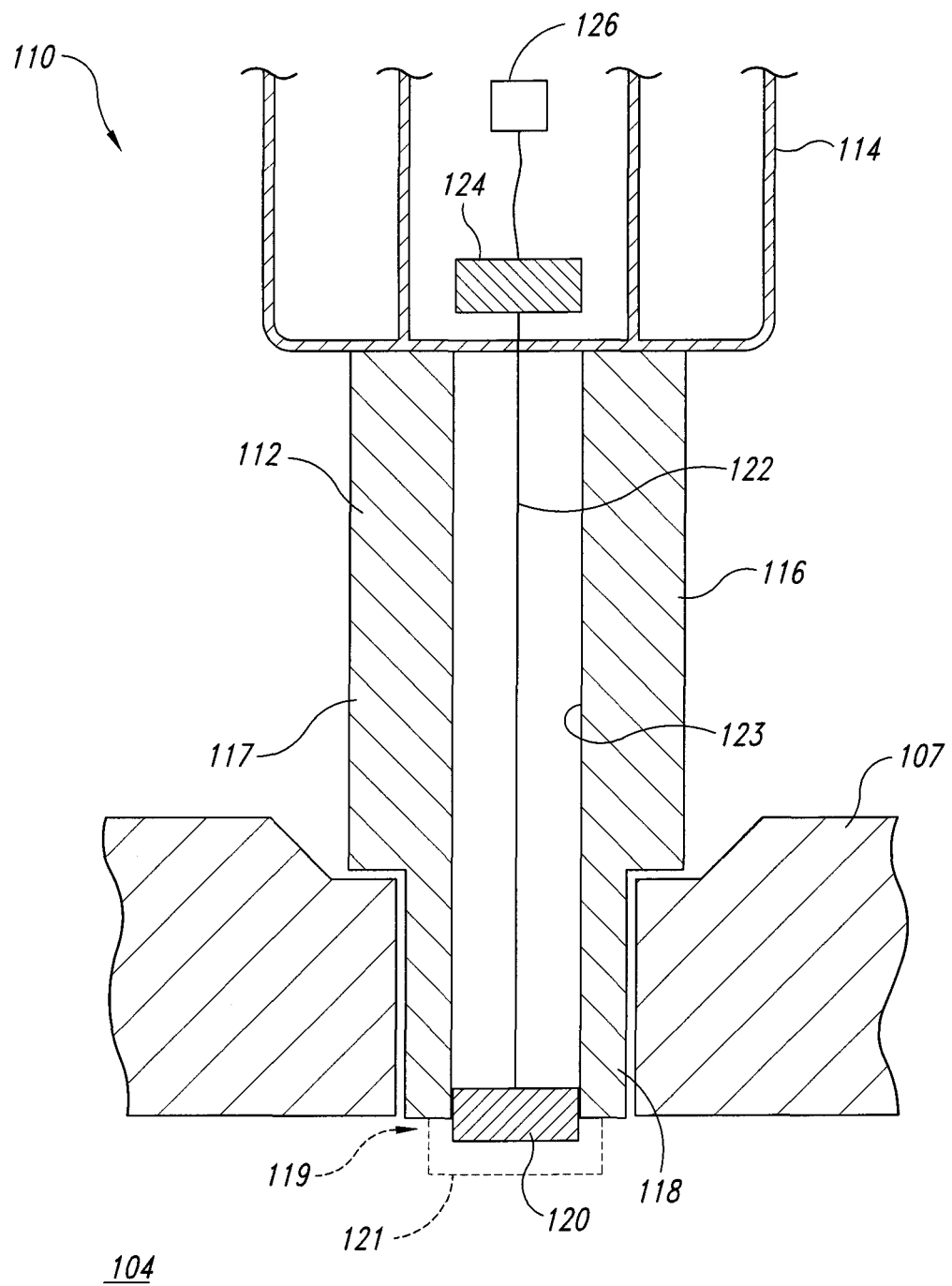
FIG. 1 is a schematic cross-sectional side view of an injector/igniter configured in accordance with some embodiments of the disclosure.

The present application incorporates by reference in its entirety the subject matter of the U.S. Patent Applications, filed concurrently herewith on Oct. 27, 2010 and titled: INTEGRATED FUEL INJECTOR IGNITERS SUITABLE FOR LARGE ENGINE APPLICATIONS AND ASSOCIATED METHODS OF USE AND MANUFACTURE U.S. patent application Ser. No. 12/913,744; and FUEL INJECTOR SUITABLE FOR INJECTING A PLURALITY OF DIFFERENT FUELS INTO A COMBUSTION CHAMBER U.S. Provisional Application No. 61/407,437.

Overview

The present disclosure describes devices, systems, and methods for combusting a fuel within a combustion chamber. The disclosure further describes devices, systems, and methods for controlling the ionization within a combustion chamber, associated systems, assemblies, components, and methods. For example, several of the embodiments described below are directed to adaptively controlling the ionization within a combustion chamber based on various conditions within the combustion chamber and/or based on various conditions at regions at or near an igniter/injector within the combustion chamber. Certain details are set forth in the following description and in FIGS. 1-9 to provide a thorough understanding of various embodiments of the disclosure. However, other details describing well-known structures and systems often associated with internal combustion engines, injectors, igniters, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed disclosure.

Suitable Systems and Components

FIG. 1 is a schematic cross-sectional side view of an integrated injector/igniter 110 ("injector 110") configured in accordance with an embodiment of the disclosure. The injector 110 illustrated in FIG. 1 is configured to inject different fuels into a combustion chamber 104, to adaptively adjust the pattern and/or frequency of the fuel injections or bursts based on combustion properties and conditions in the combustion chamber 104, and to be controlled and/or receive commands from an adaptive control system that controls the ionization within the combustion chamber 104. The injector 110 can optimize the injection of fuel for rapid ignition and complete combustion. In addition to injecting the fuel, the injector 110 includes one or more integrated ignition features that are configured to ignite the injected fuel. As such, the injector 110 can be utilized to convert conventional internal combustion engines to be able to operate on multiple choices of different fuels. Although several of the features of the illustrated injector 110 are shown schematically for purposes of illustration, several of these schematically illustrated features are described in detail below with reference to various features of embodiments of the disclosure. Accordingly, the position, size, orientation, etc. of the schematically illustrated components of the injector in FIG. 1 are not intended to limit the present disclosure. Additionally, further details regarding suitable injectors may be found in U.S. patent application Ser. No. 12/653,085, filed Dec. 7, 2009, entitled INTEGRATED FUEL INJECTORS AND IGNITERS AND ASSOCIATED METHODS OF USE AND MANUFACTURE, which is hereby incorporated by reference in its entirety.

In the illustrated embodiment, the injector 110 includes a body 112 having a middle portion 116 extending between a base portion 114 and a nozzle portion 118. The nozzle portion 118 extends at least partially through a port in an engine head 107 to position an end portion 119 of the nozzle portion 118 at the interface with the combustion chamber 104. The injector 110 further includes a passage or channel 123 extending through the body 112 from the base portion 114 to the nozzle portion 118. The channel 123 is configured to allow fuel to flow through the body 112. The channel 123 is also configured to allow other components, such as an actuator 122, to pass through the body 112, as well as instrumentation components and/or energy-conversion and source components of the injector 110. In certain embodiments, the actuator 122 can be a cable or rod that has a first end portion that is operatively coupled to a flow control device or valve 120 carried by the end portion 119 of the nozzle portion 118. As such, the flow valve 120 is positioned proximate to the interface with the combustion chamber 104. Although not shown in FIG. 1, in certain embodiments the injector 110 can include more than one flow valve, as well as one or more check valves positioned proximate to the combustion chamber 104, as well as at other locations on the body 112.

According to another feature of the illustrated embodiment, the actuator 122 also includes a second end portion operatively coupled to a driver 124. The second end portion can further be coupled to a controller or processor 126. As explained in detail below with reference to various embodiments of the disclosure, the controller 126 and/or the driver 124 are configured to rapidly and precisely actuate the actuator 122 to inject fuel into the combustion chamber 104 via the flow valve 120. For example, in certain embodiments, the flow valve 120 can move outwardly (e.g., toward the combustion chamber 104) and in other embodiments the flow valve 120 can move inwardly (e.g., away from the combustion chamber 104) to meter and control injection of the fuel. Moreover, in certain embodiments, the driver 124 can tension the actuator 122 to retain the flow valve 120 in a closed or seated position, and the driver 124 can relax the actuator 122 to allow the flow valve 120 to inject fuel, and vice versa. The driver 124 can be responsive to the controller as well as other force inducing components (e.g., acoustic, electromagnetic and/or piezoelectric components) to achieve the desired frequency and pattern of the injected fuel bursts.

In certain embodiments, the actuator 122 can include one or more integrated sensing and/or transmitting components to detect combustion chamber properties and conditions. For example, the actuator 122 can be formed from fiber optic cables, insulated transducers integrated within a rod or cable, or can include other sensors to detect and communicate combustion chamber data. Although not shown in FIG. 1, in other embodiments, and as described in detail below, the injector 110 can include other sensors or monitoring instrumentation located at various positions on the injector 110. For example, the body 112 can include optical fibers integrated into the material of the body 112, or the material of the body 112 itself can be used to communicate combustion data to one or more controllers. In addition, the flow valve 120 can be configured to sense or carry sensors in order to transmit combustion data to one or more controllers associated with the injector 110. This data can be transmitted via wireless, wired, optical or other transmission mediums. Such feedback enables extremely rapid and adaptive adjustments for optimization of fuel injection factors and characteristics including, for example, fuel delivery pressure, fuel injection initiation timing, fuel injection durations for production of multiple layered or stratified charges, the timing of one, multiple or continuous plasma ignitions or capacitive discharges, etc.

Such feedback and adaptive adjustment by the controller 126, driver 124, and/or actuator 126 also allows optimization of outcomes such as power production, fuel economy, and minimization or elimination of pollutive emissions including oxides of nitrogen. U.S. Patent Application Publication No. 2006/0238068, which is incorporated herein by reference in its entirety, describes suitable drivers for actuating ultrasonic transducers in the injector 110 and other injectors described herein.

The injector 110 can also optionally include an ignition and flow adjusting device or cover 121 (shown in broken lines in FIG. 1) carried by the end portion 119 adjacent to the engine head 107. The cover 121 at least partially encloses or surrounds the flow valve 120. The cover 121 may also be configured to protect certain components of the injector 110, such as sensors or other monitoring components. The cover 121 can also act as an ignition catalyst, catalyst carrier, insulated heat retaining thermal stimulator for fuel ignition, and/or first electrode for ignition of the injected fuels. Moreover, the cover 121 can be configured to affect the shape, pattern, and/or phase of the injected fuel. The flow valve 120 can also be configured to affect these properties of the injected fuel. For example, in certain embodiments the cover 121 and/or the flow valve 120 can be configured to create sudden gasification of the fuel flowing past these components. More specifically, the cover 121 and/or the flow valve 120 can include surfaces having sharp edges, catalysts, or other features that produce gas or vapor from the rapidly entering liquid fuel or mixture of liquid and solid fuel. The acceleration and/or frequency of the flow valve 120 actuation can also suddenly gasify the injected fuel. In operation, this sudden gasification causes the vapor or gas emitted from the nozzle portion 118 to more rapidly and completely combust. Moreover, this sudden gasification may be used in various combinations with super heating of liquid fuels and plasma or acoustical impetus of projected fuel bursts. In still further embodiments, the frequency of the flow valve 120 actuation can induce plasma projection to beneficially affect the shape and/or pattern of the injected fuel. U.S. patent application Ser. No. 672,636, (U.S. Pat. No. 4,122,816) which is incorporated herein by reference in its entirety, describes suitable drivers for actuating plasma projection by injector 110 and other injectors described herein.

According to another aspect of the illustrated embodiment, and as described in detail below, at least a portion of the body 112 is made from one or more dielectric materials 117 suitable to enable the high energy ignition to combust different fuels, including unrefined fuels or low energy density fuels. These dielectric materials 117 can provide sufficient electrical insulation of the high voltage for the production, isolation, and/or delivery of spark or plasma for ignition. In certain embodiments, the body 112 can be made from a single dielectric material 117. In other embodiments, however, the body 112 can include two or more dielectric materials. For example, at least a segment of the middle portion 116 can be made from a first dielectric material having a first dielectric strength, and at least a segment of the nozzle portion 118 can be made from a dielectric material having a second dielectric strength that is greater than the first dielectric strength. With a relatively strong second dielectric strength, the second dielectric material can protect the injector 110 from thermal and mechanical shock, fouling, voltage tracking, etc. Examples of suitable dielectric materials, as well as the locations of these materials on the body 112, are described in detail below.

In addition to the dielectric materials, the injector 110 can also be coupled to a power or high voltage source to generate the ignition event to combust the injected fuels. The first electrode can be coupled to the power source (e.g., a voltage generation and/or multiplying source such as a capacitance discharge, induction, or piezoelectric system) via one or more conductors extending through the injector 110. Regions of the nozzle portion 118, the flow valve 120, and/or the cover 121 can operate as a first electrode to generate an ignition event (e.g., spark, plasma, compression ignition operations, high energy capacitance discharge, extended induction sourced spark, and/or direct current or high frequency plasma, in conjunction with the application of ultrasound to quickly induce, impel, and complete combustion) with a corresponding second electrode of the engine head 107. As explained in detail below, the first electrode can be configured for durability and long service life. In still further embodiments of the disclosure, the injector 110 can be configured to provide energy conversion from combustion chamber sources and/or to recover waste heat or energy via thermochemical regeneration to drive one or more components of the injector 110 from the energy sourced by the combustion events.

Figure 2:
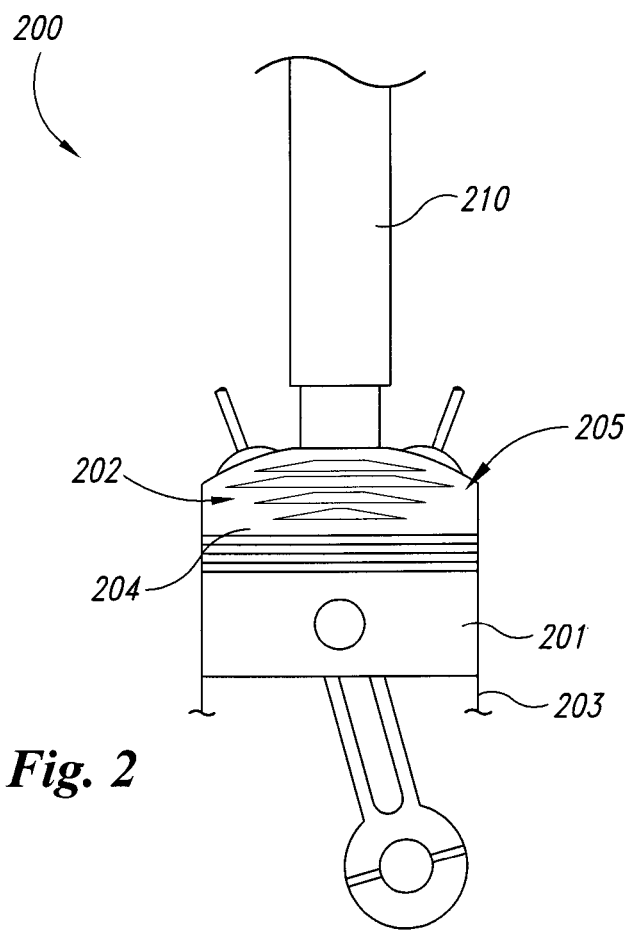
FIG. 2 is a side view of a system configured in accordance with some embodiments of the disclosure.
Figure 3A:
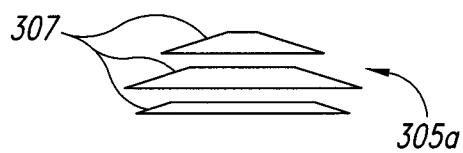
FIGS. 3A-3D illustrates several representative layered burst patterns of fuel that can be injected by the injectors configured in accordance with some embodiments of the disclosure.
Figure 3B:
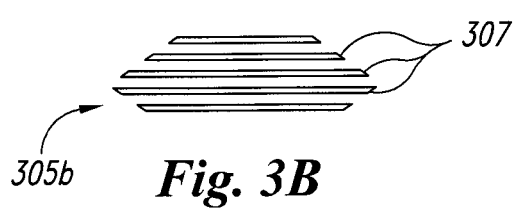
Figure 3C:
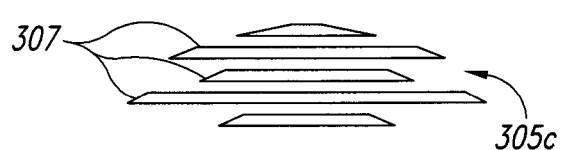
Figure 3D:
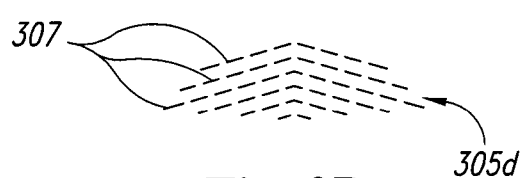

FIG. 2 is a side view illustrating the environment of a portion of an internal combustion system 200 having a fuel injector 210 configured in accordance with some embodiments of the disclosure. In the illustrated embodiment, the schematically illustrated injector 210 is merely illustrative of one type of injector that is configured to inject and ignite different fuels in a combustion chamber 202 of an internal combustion engine 204. As shown in FIG. 2, the combustion chamber 202 is formed between a head portion containing injector 210 and valves, movable piston 201 and the inner surface of a cylinder 203. In other embodiments, however, the injector 210 can be used in other environments with other types of combustion chambers and/or energy transferring devices including various vanes, axial, and radial piston expanders along with numerous types of rotary combustion engines. As described in greater detail below, the injector 210 includes several features that not only allow the injection and ignition of different fuels in the combustion chamber 202, but that also enable the injector 210 to adaptively inject and ignite these different fuels according to different combustion conditions or requirements and/or adaptively modify the ionization levels within the combustion chamber 202. For example, the injector 210 includes one or more insulative materials that are configured to enable high energy ignition to combust different fuel types, including unrefined fuels or low energy density fuels. These insulative materials are also configured to withstand the harsh conditions required to combust different fuel types, including, for example, high voltage, fatigue, impact, oxidation, and corrosion degradation.

According to another aspect of the illustrated embodiment, the injector 210 can further include instrumentation for sensing various properties of the combustion processes in combustion chamber 202 (e.g., properties of the fuel penetration into air, ignition, combustion process, the combustion chamber 202, the engine 204, etc.). In response to these sensed conditions, the injector 210 can adaptively optimize the fuel injection and ignition characteristics, modify ionization levels, and so on to achieve increased fuel efficiency and power production, decrease noise, engine knock, heat losses and/or vibration to extend the engine and/or vehicle life. Moreover, the injector 210 also includes actuating components to inject the fuel into the combustion chamber 202 to achieve specific flow or spray patterns 205, as well as the phase, of the injected fuel. For example, the injector 210 can include one or more valves positioned proximate to the interface of the combustion chamber 202. The actuating components of the injector 210 provide for precise, high frequency operation of the valve to control at least the following features: the timing of fuel injection initiation and completion; the frequency and duration of repeated fuel injections; and/or the timing and selection of ignition events.

FIGS. 3A-3D illustrate several fuel burst patterns 305 (identified individually as first-fourth patterns 305a-305d) that can be presented by an injector configured in accordance with embodiments of the disclosure. As those of ordinary skill in the art will appreciate, the illustrated patterns 305 are merely representative of some embodiments of the present disclosure. Accordingly, the present disclosure is not limited to the patterns 305 shown in FIGS. 3A-3D, and in other embodiments injectors can dispense burst patterns that differ from the illustrated patterns 305. Although the patterns 305 illustrated in FIGS. 3A-3D have different shapes and configurations, these patterns 305 share the feature of having sequential fuel layers 307. The individual layers 307 of the corresponding patterns 305 provide the benefit of a relatively large surface to volume ratios of the injected fuel. These large surface to volume ratios provide higher combustion rates of the fuel charges, as well as assist in insulating and accelerating complete combustion the fuel charges. Such fast and complete combustion provides several advantages over slower burning of fuel charges. For example, slower burning fuel charges require earlier ignition, cause significant heat losses to combustion chamber surfaces, and produce more backwork or output torque loss to overcome early pressure rise from the earlier ignition during the compression process of the engine cycle. Such previous combustion operations are also plagued by pollutive emissions (e.g., carbon-rich hydrocarbon particulates, oxides of nitrogen, carbon monoxide, carbon dioxide, quenched and unburned hydrocarbons, etc.) as well as harmful heating and degradation of lubricative films on the cylinder wall, piston, rings and consequent wear of pistons, rings, cylinder walls, valves, and other components of the combustion chamber.

Thus, systems and injectors according to the present disclosure provide the ability to replace conventional injectors, glow plugs, or spark plugs (e.g., diesel fuel injectors, spark plugs for gasoline, etc.) and develop full rated power with a wide variety of renewable fuels, such as hydrogen, methane, and various inexpensive fuel alcohols produced from widely available sewage, garbage, and crop and animal wastes. Although these renewable fuels may have approximately 3,000 times less energy density compared to refined fossil fuels, the systems and injectors of the present disclosure are capable of injecting and igniting these renewable fuels for efficient energy production and greatly reduced or eliminated overall production of greenhouse gases.

Figure 4:
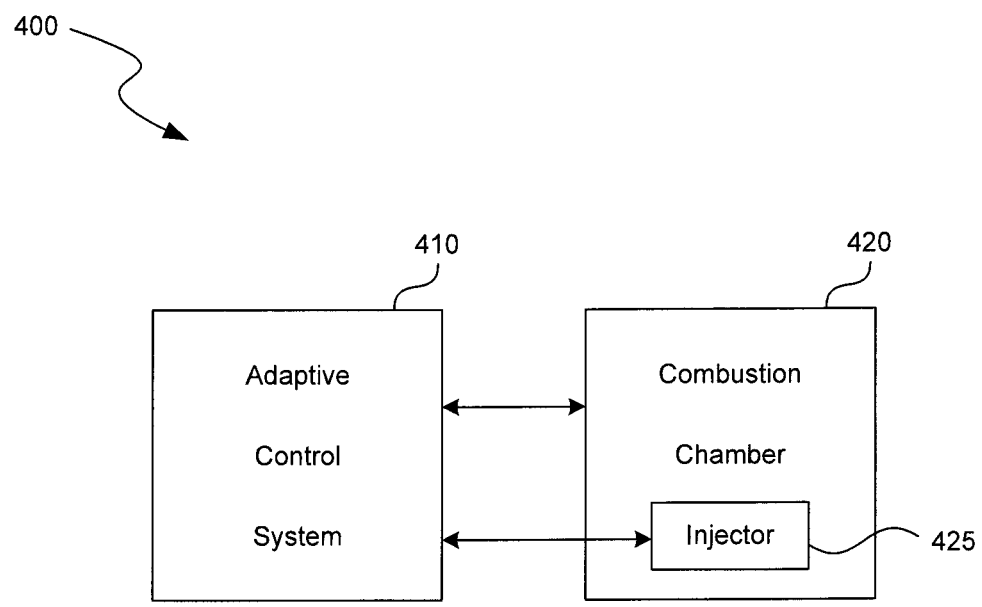
FIG. 4 is a block diagram illustrating a suitable system for adaptively controlling ionization in accordance with some embodiments of the disclosure.

As discussed herein, in some embodiments an ionization control system communicates with injectors to control, modify, and/or tailor ionization levels within a combustion chamber. FIG. 4 shows a system 400 for adaptively controlling ionization. The system 400 includes an adaptive control system 410 in communication with an injector 425 or other components within a combustion chamber 420. Further details regarding the adaptive control system 410, the combustion chamber 420, and the injector 425 will now be discussed.

Figure 5:
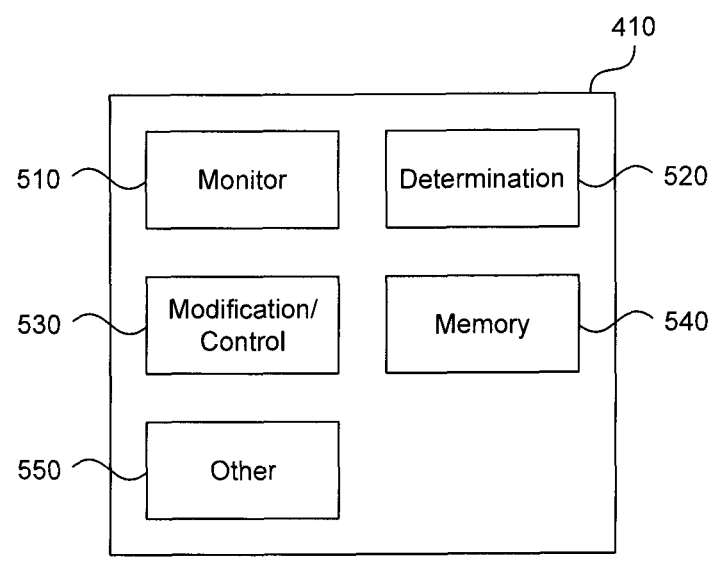
FIG. 5 is a block diagram illustrating an adaptive control system in accordance with some embodiments of the disclosure.

Systems, devices, components, and modules described herein, such as those shown in FIGS. 4-6, may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the system can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 5 is a block diagram illustrating an adaptive control system 410 in accordance with some embodiments of the disclosure. The adaptive control system 410 includes various hardware and/or software modules configured or programmed to monitor conditions within a combustion chamber, control an injector within the combustion chamber, adjust ionization levels within the combustion chamber, and so on.

The adaptive control system 410 includes a monitoring module or component 510 that monitors conditions within a combustion chamber. For example, the monitoring module 510 may monitor a temperature within a combustion chamber during combustion, a pressure within a combustion chamber during combustion, or other conditions described herein.

The adaptive control system 410 also includes a determination module or component 520 that determines a monitored condition matches certain criteria. The determination module 520 may receive information from the monitoring module 510 regarding certain conditions within a combustion chamber and determine that the conditions match predetermined or specified criteria associated with desirable or undesirable conditions within the combustion chamber.

In response to information received from the determination module 520, a modification module or component 530 may modify or control one or more parameters associated with a combustion event. For example, the modification module 530 may transmit control information to an injector instructing the injector to modify the application of an ionization voltage and/or current across electrodes used to combust fuel within the combustion chamber.

The adaptive control system 410 also includes a memory module or component 540 that stores information, criteria, logs, algorithms, and/or other information associated with the adaptive control of ionization levels within a combustion chamber, as well as other modules 550 or components, such as modules that communicate information to other devices on a network, modules that facilitate user interaction with the adaptive control system 410 (e.g., user interfaces, touch screens, and so on), and other components that facilitate performing the routines and methods described herein.

FIG. 6 illustrates a suitable adaptively controlled igniter/injector 600, such as an injector capable of being controlled by the adaptive control system 410 to implement ionization control and modification within a combustion chamber. FIG. 7 is an end view of the igniter/injector 600 of FIG. 6. The injector 600 includes various components capable of measuring, monitoring, and/or detecting conditions within or near the injector 600. For example, the injector 600 includes a transparent dielectric insulator 672, that provides light pipe transmission of radiation frequencies from the combustion chamber to an optoelectronic sensor 662P, along with a varying strain signal corresponding to combustion chamber pressure conditions to a stress sensor 662D.

An embedded controller 662 receives signals from the sensors 662D and 662P for production of analog or digitized fuel-delivery and spark-ignition events as a further improvement in efficiency, power production, operational smoothness, fail-safe provisions, and longevity of engine components. The controller 662 may record sensor indications or information to determine the time between each cylinder's torque development to derive positive and negative engine acceleration as a function of adaptive fuel-injection and spark-ignition timing, and flow data in order to determine adjustments needed for optimizing desired engine operation parameters. Accordingly, the controller 662 may act as the master computer to control various selections of operations by the injector, as well as to communicate with the adaptive control system 410 and its various modules. Of course, the injector 600 may include other components that receive control data from the adaptive control system 410.

A substantially transparent check valve 684 may protect the fiber optic bundle or cable 660 below the flow control valve 674. In some cases, the check valve 684 may be fast closing and include a ferromagnetic element encapsulated within a transparent body. Various geometries of components may assist in operation of the check valve 684, including a ferromagnetic disk within a transparent disk or a ferromagnetic ball within a transparent ball, as shown. In operation, the geometries enable the check valve 684 to be magnetically forced to the normally closed position to be very close to flow control valve 674 and the end of cable 660, as shown. When the flow control valve 674 is lifted to provide fuel flow, the check valve 684 is forced to the open position within the well bore that cages it within the intersecting slots 688 that allow fuel to flow through a magnetic valve seat 690 past the check valve 684 and through slots 688 to present a very high surface to volume penetration of fuel into the air in the combustion chamber. Accordingly, the cable 660 monitors the combustion chamber events by receiving and transmitting radiation frequencies that pass through the check valve 684. Suitable materials for the transparent portions of the check valve 684 include sapphire, quartz, high temperature polymers, ceramics, and other materials that are transparent to desired monitoring frequencies.

In some cases, it may be desirable to produce the greatest torque with the least fuel consumption. In areas such as congested city streets, where oxides of nitrogen emissions are objectionable, adaptive fuel injection and ignition timing provides maximum torque without allowing peak combustion temperatures to reach 2,200° C. (4,000° F.). A flame temperature detector that utilizes a small diameter fiber optic cable 660 or a larger transparent insulator 672 may be used to detect peak combustion temperatures. In such cases, the insulator 672 may be manufactured with heat and abrasion resisting coatings such as sapphire or diamond-coating on the combustion chamber face of a high temperature polymer, or from quartz, sapphire, or glass for combined functions within the injector 600, including the light-pipe transmission of radiation produced by combustion to a sensor 662D of controller 662, as shown. Further, the controllers 662, 643, and/or 632 may monitor the signal from sensor 662D in each combustion chamber to communicate conditions to the adaptive control system 410 that can adaptively adjust the fuel-injection and/or spark-ignition timing to adapt the ionization to desired levels.

Thus, virtually any distance from the interface to the combustion chamber to a location above the tightly spaced valves and valve operators of a modern engine can be provided by fuel control forces transmitted to normally closed flow control valve 674 by insulative cable 660 along with integral spark ignition at the most optimum spark plug or diesel fuel injector location. The configuration of the fuel injector 600 allows an injector to replace the spark plug or diesel fuel injector to provide precision fuel-injection timing and adaptive spark-ignition for high efficiency stratified charge combustion of a very wide variety of fuel selections, including less expensive fuels, regardless of octane, cetane, viscosity, temperature, or fuel energy density ratings, and to provide adaptable ionization levels within a combustion chamber. Engines that were previously limited in operation to fuels with specific octane or cetane ratings are transformed to more efficient longer lived operation by the present disclosure on fuels that cost less and are far more beneficial to the environment. In addition, it is possible to operate an injector as a pilot fuel delivery and ignition system or as a spark-only ignition system to return the engine to original operation on gasoline delivered by carburetion or intake manifold fuel injection systems. Similarly, it is possible to configure injector 600 for operation with diesel fuel or alternative spark-ignited fuels according to these various fuel metering, ionization control, and other ignition combinations.

Thus, the system can adaptively control fuel-injection timing and spark-ignition timing for such purposes as maximizing fuel economy, specific power production, assuring lubricative film maintenance on combustion chamber cylinders, minimizing noise, controlling ionization levels, and so on. In some cases, the injector 600 may extend the cable 660 fixedly through the flow control valve 674 to or near the combustion chamber face of fuel distribution nozzle to view combustion chamber events through the center of slots 688, as shown. In some cases, the cable 660 can form one or more free motion flexure extents, such as loops above armature-stop ball 635, which preferably enables armature 648 to begin movement and develop momentum before starting to lift cable 660 to thus suddenly lift flow control valve, and fixedly passes through the soft magnet core 654 to deliver radiation wavelengths from the combustion chamber to sensor 640, as shown.

In some embodiments, the sensor 640 may be separate or integrated into the controller 643 as shown. For example, an optoelectronic sensor system may comprehensively monitor combustion chamber conditions, including combustion, expansion, exhaust, intake, fuel injection and ignition events as a function of pressure and/or radiation detection in the combustion chamber of engine 630, as shown. Thus, the temperature and corresponding pressure signals from sensor 640 and/or sensor 662D and/or sensor 662P enable controller 632 to instantly or quickly correlate the temperature and time at temperature, as fuel is combusted with the combustion chamber pressure, piston position, and with the chemical nature of the products of combustion.

Such correlation is readily accomplished by operating an engine with combined data collection of piston position, combustion chamber pressure by the technology disclosed in U.S. Pat. Nos. 6,015,065; 6,446,597; 6,503,584; 5,343,699; and 5,394,852; along with co-pending application 60/551,219 and combustion chamber radiation data as provided by fiber optic bundle/light pipe assembly/cable 660 to sensor 640 as shown. Correlation functions that are produced thus enable the radiation signal delivered by cable 660 to sensor 640 and piston position data to indicate the combustion chamber pressure, temperature, and pattern of combustion conditions as needed to adaptively optimize various engine functions such as maximization of fuel economy, power production, avoidance of oxides of nitrogen, avoidance of heat losses and the like. Thereafter the data provided by cable 660 and sensor 640 to controller 643 can enable rapid and adaptive control of the engine functions with a very cost effective injector.

In some embodiments, a more comprehensively adaptive injection system can incorporate both the sensor 640 and cable 660 along with one or more pressure sensors as is known in the art and/or as is disclosed in the patents and co-pending applications included by reference herein. In some cases, the system, via one or more controllers, monitors the rotational acceleration of the engine for adaptive improvement of fuel economy and power production management. Engine acceleration accordingly may be monitored by numerous techniques including crankshaft or camshaft timing, distributor timing, gear tooth timing, piston speed detection, and so on. Engine acceleration as a function of controlled variables including fuel species selection, fuel species temperature, fuel injection timing, injection pressure, injection repetition rate, ignition timing and combustion chamber temperature mapping facilitate improvements with conventional or less-expensive fuels in engine performance, fuel economy, emissions control, engine life, and so on.

In some embodiments, a development of spark plasma ignition with adaptive timing to optimize combustion of widely varying fuel viscosities, heating values, and vapor pressures is achieved by combining the remote valve operator 648 and the flow control valve 674 to be positioned at or substantially adjacent to the combustion chamber interface. This configuration virtually eliminates harmful before or after dribble because there is little or no clearance volume between flow control valve 674 and the combustion chamber. Fuel flow impedance, ordinarily caused by channels that circuitously deliver fuel, is avoided by locating the flow control valve 674 at the combustion chamber interface. In some embodiments, the flow control valve 674 can be urged to the normally closed condition by a suitable mechanical spring or by compressive force on cable or rod 660 as a function of force applied by spring or by magnetic spring attraction to valve seat 690, including combinations of such closing actions.

In some embodiments, pressure-tolerant performance is achieved by providing free acceleration of the armature driver 648 followed by impact on the ball 635, which is fixed on cable 660 at a location that is configured to suddenly lift or displace the ball 635. In some cases, the driver 648 moves relatively freely toward the electromagnetic pole piece and past stationery cable 660, as shown. After considerable momentum has been gained, the driver 648 strikes the ball 635 within the spring well shown. The ball 635 may be attached to the cable 660 within the spring 636, as shown. Thus, in operation, the sudden application of a large or much larger force by this impact could be developed by a direct acting solenoid valve causing the relatively smaller inertia and normally closed flow control valve 674 to suddenly lift from the upper valve seat of the passageway in seat 690.

Any suitable seat for flow control valve 674 may be utilized, however, for applications with combustion chambers of small engines, the injector may incorporate a permanent magnet within or as seat 690 to urge flow control valve 674 to the normally closed condition, as shown. Such sudden impact actuation of flow control valve 674 by armature 648 enables assured precision flow of fuel regardless of fuel temperature, viscosity, presence of slush crystals, or the applied pressure that may be necessary to assure desired fuel delivery rates. Permanent magnets such as SmCo and NdFeB readily provide the desired magnetic forces at operating temperatures up to 205° C. (401° F.) and assure that the flow control valve 674 is urged to the normally closed position on magnetic valve seat 690 to virtually eliminate clearance volume and after dribble.

For example, if the flow control valve 674 is incorporated with armature 648 for delivery within the bore of an insulator 664 to conductive nozzle 670, the after dribble of fuel that temporarily rested in the clearance volume shown could be as much in volume as the intended fuel delivery at the desired time in the engine cycle. Such flow of after dribble could be during the last stages of expansion or during the exhaust stroke and therefore would be mostly, if not completely, wasted, while causing flame impingement loss of protective cylinder wall lubrication, needless piston heating, and increased friction due to differential expansion, and overheating of exhaust system components. Further, conventional valve operation systems would be limited to pressure drops of about 7 atmospheres compared to more than 700 atmospheres as provided by the sudden impact of driver 648 on cable 660 and thus on flow control valve 674. Cryogenic slush fuels with prohibitively difficult textures and viscosities comparable to applesauce or cottage cheese are readily delivered through relatively large passageways to normally closed flow control valve 674, which rests upon the large diameter orifice in seat 690. Rapid acceleration, then sudden impact of large inertia electro-magnet armature 648 transfers a very large lifting force through dielectric cable 660 to suddenly and assuredly lift flow control valve 674 off the large orifice in seat 690 to open normally closed check valve 684, if present, and jet the fuel slush mixture into the combustion chamber. The same assured delivery if provided without or with limited after dribble for fuels in any phase or mixtures of phases including hydrogen and other very low viscosity fuels at temperatures of 400° F. (204° C.) or higher as may be intermittently provided.

Adaptive Control of Ionization Levels in a Combustion Chamber

Figure 8:
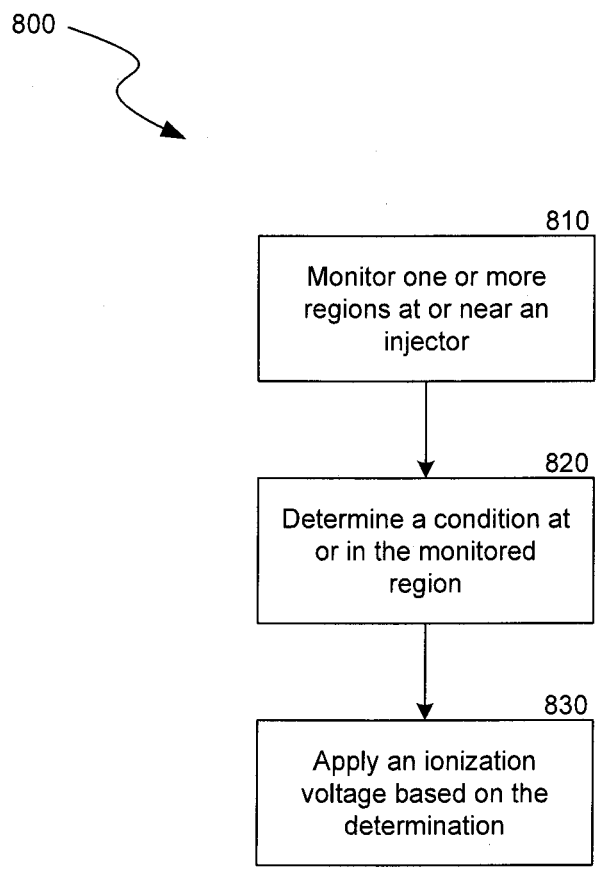
FIG. 8 is a flow diagram illustrating a routine for combusting a fuel within a combustion chamber in accordance with some embodiments of the disclosure.
Figure 9:
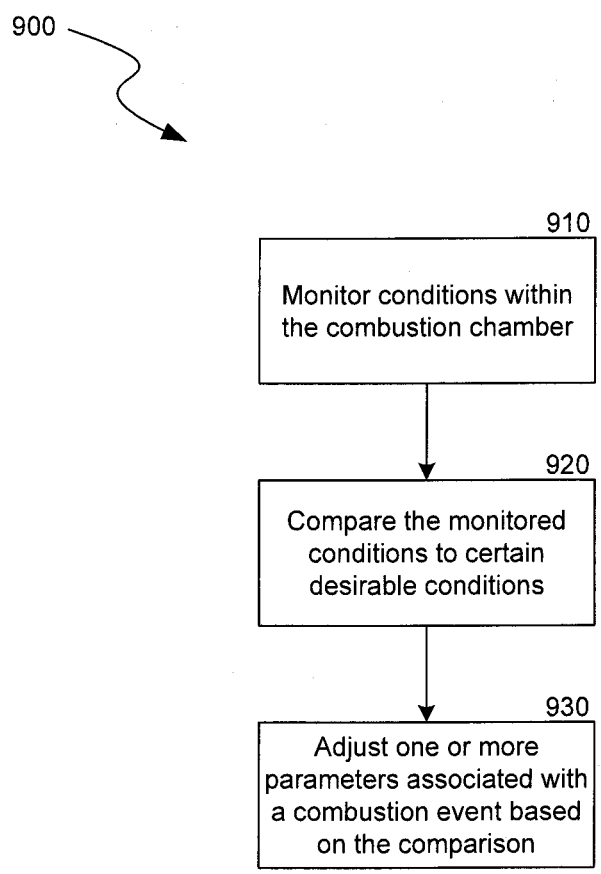
FIG. 9 is a flow diagram illustrating a routine for adjusting a degree of ionization within a combustion chamber in accordance with some embodiments of the disclosure.

As described herein, in some embodiments, an injector, such as injector 100 or 600, monitors conditions within a combustion chamber, communicates monitored information to a control system, receives feedback from the control system, and adjusts operation based on the feedback. Thus, an injector receiving commands or instructions from a control system can adaptively adjust ionization levels within a combustion chamber to achieve desired levels of ionization, providing for rapid developments of sustained combustion within the combustion chamber, among other benefits. FIGS. 8 and 9 illustrate various routines performed by a control system instructing such injectors, such as the adaptive control system 410 or other control systems located at or remote from the injectors.

FIG. 8 is a flow diagram illustrating a routine 800 for combusting a fuel within a combustion chamber. In step 810, the system monitors one or more regions at or near an injector, such as regions near electrodes or check valves, during given or specified time periods of operation of an injector. The system may utilize a monitoring module 510 in collaboration with various components of an injector that monitor conditions, such as the cable 660, the insulator 672, the sensors 662, and/or others.

Various regions may be monitored at certain time periods, such as regions located near or between electrodes, near or within check valves, and so on. Example regions of injector 600 that may be monitored include:

Regions of air in the gap between electrodes, such as a gap between electrodes 685 and 688, just before the arrival of fuel as it passes valves such as 674 and/or 684;

Regions of fuel that is controlled and metered by valve 674 to pass through the gap between electrodes, such as a gap between electrodes 685 and 688;

Regions of air and fuel in the gap between electrodes, such as a gap between electrodes 685 and 688;

Regions of air-fuel-air layers in the gap between electrodes, such as a gap between electrodes 685 and 688; and other regions.

In step 820, the system detects or determines a certain, satisfactory, and/or suitable condition at or in the monitored region. For example, the system, using various components described here, determines that a certain condition associated with a certain amount of fuel located between two electrodes has been satisfied.

In step 830, the system applies an ionization voltage to electrodes at or near the region determined to satisfy the predetermined conditions. For example, the system in response to determining that sufficient fuel is located in a gap between electrodes 685 and 688, applies a voltage across the electrodes, causing a combustion event and achieving a desired ionization level, Thus, in some embodiments, the system employs routine 800 in order to time one or more applications of ionizing voltage to produce sufficient ionization at or near a combustion chamber interface of a region of fuel, a region of air and fuel, and/or a region of an air-fuel-air mixture.

Thus, the system can achieve sufficient and efficient ionization of these substances, causing a comparatively more rapid development of sustained combustion than can be provided by conventional engine operations. By employing routine 800, the system utilizes comparatively less energy for such ionization than required to compress the air sufficiently and pump fuel to very high pressures and to operate glow plugs when required to cause combustion after a characteristic delay.

In cases when the system operates with a diesel engine, the ionization as provided in one or more of the regions described herein is sufficient to provide substantial evaporation, molecular cracking and ionization to achieve a much more rapid sustained reaction with air in the combustion chamber. The timing of the start of ionized air and/or fuel injection is later if not entirely after TDC (ATDC), producing comparatively more work per fuel value to increase the range and fuel efficiency of the engine, among other benefits.

In addition to adaptively controlling the application of ionization voltage to achieve certain combustion events, the system may also adaptively control ionization levels within a combustion chamber. That is, the degree of ionization may be adaptively increased or decreased to achieve a desired degree of accelerated completion of combustion of fuel that is delivered by one or more fuel injection events per power cycle of an engine. FIG. 9 is a flow diagram illustrating a routine 900 for adjusting a degree of ionization within a combustion chamber.

In step 910, the system monitors one or more conditions within the combustion chamber. The system may utilize the monitoring module 510 in collaboration with various components of an injector that monitor conditions, such as the cable 660, the insulator 672, the sensors 662, and/or others. Examples of conditions that may be monitored include: the torque produced per BTU or Kcal of fuel value that is injected per each fuel injection event, the maximum temperature of combustion, the pressure produced by the combustion process, and other conditions described herein.

In step 920, the system compares the monitored conditions to desirable or ideal conditions. The system may detect or determine that one or more monitored condition satisfies a rule or threshold, or does not satisfy a rule or threshold. For example, the system may detect a maximum temperature higher than a threshold value or a pressure lower than a threshold value, and determine that a rule associated with adjusting the ionization level has been satisfied.

In step 930, the system, in response to determinations made in step 920 adjusts one or more parameters associated with a combustion event within a combustion chamber, which adjusts the degree of ionization within the combustion chamber. The system may increase or decrease the parameter. Example parameters or variables include: Compression ratio, Barometric pressure, Supercharge pressure, Temperature of air entering the combustion chamber, Temperature of the compressed air after heat losses to the piston, cylinder, and head, Timing of start of injection, Injection pressure, Injection orientation and stratified ionization pattern, Injection duration, Injector discharge curve, and so on.

Thus, in some cases, a relatively minor amount of fuel and/or air may be ionized to trigger comparatively earlier completion of combustion than by conventional spark development in a tiny fraction of the total homogeneous mixture present, and similarly a relatively minor amount of fuel and/or air may be ionized to trigger comparatively earlier completion of diesel fuel combustion than can be accomplished by compression ignition sequences. In some cases, it may be desirable to ionize all or a majority of the fuel molecules that enter the combustion chamber to assure the most effective utilization of surplus air as an insulator of the accelerated combustion process.

In addition to the routines and methods described with respect to FIGS. 8 and 9, the system may accelerate the completion of combustion by utilizing certain fuel species. Table 1 shows the utilization of various fuel species, such as substances that may be derived by thermochemical regeneration of a precursor fuel to improve the heating value of ionized fuel species that are controlled by the adaptive control system 410. The table shows the precursor fuel, the new fuel species, the new fuel heat, and the advantage of reducing the energy required to ionize the new fuel species compared to the precursor fuel:

TABLE 1

| Precursor fuel | New Fuel Species | New Fuel Species | New Fuel Heat Value | +/− Req'd Ionization Energy |
|---|---|---|---|---|
| CH4 | CO | H2 | 125% of CH4 | − (less) |
| NH3 | — | H2 | 125% of NH3 | − |
| Gasoline | CO | H2 | 120% of Gasoline | − |
| Diesel fuel | CO | H2 | 120% of Diesel fuel | − |
| Jet fuel | CO | H2 | 122% of Jet Fuel | − |
| Urea (as fuel) (NH2)2CO | CO | H2 | 130% of Urea | − |
| CH3OH + H2O + nC | CO | H2 | 130 to 200% of CH3OH | − |

Particularly valuable benefits result from adaptively ionizing the substances listed in Table 1, including reduction if not elimination of the subsystems now required for operation of homogeneous charge and diesel engines. Subsystems such as those listed in Table 2 may be eliminated with great savings in the operating costs and reductions in emissions:

TABLE 2

| Exhaust System Component Eliminated | Engine Control System Eliminated |
|---|---|
| Catalytic Accumulator | Diesel Knock Detector |
| Urea Dissociation Reactor | Diesel Fuel Injector(s) |
| NOx Sensor | Gasoline Fuel Injector(s) |
| Electric Exhaust Heater | Urea Exhaust Injector |
| Recirculation Valve | Urea Storage Tank |
| Recirculation Pump | Glow Plugs |
| Recirculation Process Control | Intake Vacuum Sensor |
| Recirculation Pressure Sensor | Particulate Trap Pressure Sensor |
| Recirculation Temperature Sensor | Cat Accumulator Pressure Sensor |

CONCLUSION

It will be apparent that various changes and modifications can be made without departing from the scope of the disclosure. For example, the dielectric strength may be altered or varied to include alternative materials and processing means. The actuator and driver may be varied depending on fuel or the use of the injector. The cap may be used to insure the shape and integrity of the fuel distribution and the cap may vary in size, design or position to provide different functions, performance and protection. Alternatively, the injector may be varied, for example, the electrode, the optics, the actuator, various catalysts, the nozzle or the body may be made from alternative materials or may include alternative configurations than those shown and described and still be within the spirit of the disclosure.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. A method for combusting fuel within a combustion chamber, the method comprising:
    monitoring a region within a combustion chamber during use of an engine;
    sensing a certain condition such as combustion, expansion, exhaust, intake, fuel ignition events as a function of pressure and/or radiation detection within the combustion chamber;
    determining the certain condition at the monitored region within the combustion chamber has been satisfied; and
    applying an ionization voltage across electrodes associated with the monitored region in response to determining the certain condition has been satisfied.

2. The method of claim 1, wherein determining the certain condition at the monitored region within the combustion chamber has been satisfied includes determining a certain amount of fuel is within the monitored region.

3. The method of claim 1, wherein determining the certain condition at the monitored region within the combustion chamber has been satisfied includes determining a certain ratio of fuel to air is within the monitored region.

4. The method of claim 1, wherein determining the certain condition at the monitored region within the combustion chamber has been satisfied includes determining a certain amount of air-fuel-air mixture is within the monitored region.

5. The method of claim 1, wherein determining the certain condition at the monitored region within the combustion chamber has been satisfied includes determining fuel is within the monitored region at a certain time period.

6. A method for adjusting the ionization level within a combustion chamber, the method comprising:
   sensing a condition such as combustion, expansion, exhaust, intake, fuel ignition events as a function of pressure and/or radiation detection within the combustion chamber;
   monitoring the condition during a combustion event within a combustion chamber during use of an engine;
   comparing values for the monitored condition to satisfactory values for the monitored condition; and
   adjusting one or more parameters associated with the combustion event within the combustion chamber.

7. The method of claim 6, wherein monitoring a condition during a combustion event within a combustion chamber includes monitoring torque produced per BTU of fuel value injected during fuel injection within the combustion event.

8. The method of claim 6, wherein monitoring a condition during a combustion event within a combustion chamber includes monitoring a maximum temperature of the combustion event.

9. The method of claim 6, wherein monitoring a condition during a combustion event within a combustion chamber includes monitoring pressure produced during the combustion event.

10. The method of claim 6, wherein adjusting one or more parameters associated with the combustion event within the combustion chamber increases an ionization level within the combustion chamber.

11. The method of claim 6, wherein adjusting one or more parameters associated with the combustion event within the combustion chamber decreases an ionization level within the combustion chamber.

12. The method of claim 6, wherein adjusting one or more parameters associated with the combustion event within the combustion chamber includes adjusting a pressure within the combustion chamber.

13. The method of claim 6, wherein adjusting one or more parameters associated with the combustion event within the combustion chamber includes adjusting a temperature of air within the combustion chamber.

14. The method of claim 6, wherein adjusting one or more parameters associated with the combustion event within the combustion chamber includes adjusting a start time for injecting fuel into the combustion chamber.

15. The method of claim 6, wherein adjusting one or more parameters associated with the combustion event within the combustion chamber includes adjusting a pressure of injection of fuel into the combustion chamber.

16. The method of claim 6, wherein adjusting one or more parameters associated with the combustion event within the combustion chamber includes adjusting a stratified ionization pattern within the combustion chamber.

17. The method of claim 6, wherein adjusting one or more parameters associated with the combustion event within the combustion chamber includes adjusting a duration for injecting fuel into the combustion chamber.

18. A system for adjusting parameters associated with a combustion event, the system comprising:
    a monitoring module, wherein the monitoring module is configured to monitor conditions within a combustion chamber wherein the monitoring the conditions further includes sensing combustion, expansion, exhaust, intake, fuel ignition events as a function of pressure and/or radiation detection within the combustion chamber;
    a determination module, wherein the determination module is configured to determine one or more monitored conditions satisfies a rule associated with adjusting parameters associated with the combustion chamber; and
    a control module, wherein the control module is configured to adjust one or more parameters in response to the determination that one or more monitored conditions satisfies the rule.

19. The system of claim 18, wherein the monitoring module is a component of a fuel injector within the combustion chamber; and
    wherein the control module transmits instructions to the fuel injector to cause the fuel injector to adjust operation of injecting fuel into the combustion chamber.

20. The system of claim 18, wherein the monitoring module is a component of a fuel injector within the combustion chamber; and
    wherein the control module transmits instructions to the fuel injector to cause the fuel injector to adjust an ionization voltage applies to a fuel ignition gap between electrodes of the fuel injector.

* * * * *